United States Patent
Smith et al.

(10) Patent No.: US 8,630,523 B2
(45) Date of Patent: Jan. 14, 2014

(54) METHODS OF PREPARING STRENGTH MEMBER PULLING MEMBERS IN FIBER OPTIC CABLE FURCATIONS AND RELATED COMPONENTS, ASSEMBLIES, AND FIBER OPTIC CABLES

(75) Inventors: Matthew Wade Smith, Conover, NC (US); Wesley Allan Yates, Lenoir, NC (US)

(73) Assignee: Corning Cable Systems LLC, Hickory, NC (US)

( * ) Notice: Subject to any disclaimer, the term of this patent is extended or adjusted under 35 U.S.C. 154(b) by 272 days.

(21) Appl. No.: 13/181,785

(22) Filed: Jul. 13, 2011

(65) Prior Publication Data

US 2013/0016948 A1 Jan. 17, 2013

(51) Int. Cl.
*G02B 6/00* (2006.01)
*G02B 6/44* (2006.01)

(52) U.S. Cl.
USPC ............................. 385/136; 385/113; 385/134

(58) Field of Classification Search
USPC .................................................. 385/113, 136
See application file for complete search history.

(56) References Cited

U.S. PATENT DOCUMENTS

| | | | | |
|---|---|---|---|---|
| 4,460,159 A * | 7/1984 | Charlebois et al. | ..... | 254/134.3 R |
| 4,514,005 A * | 4/1985 | Fallon | ........................ | 294/86.42 |
| 4,601,507 A | 7/1986 | Fallon | ........................ | 294/86.42 |
| 5,083,875 A * | 1/1992 | Cedrone | ........................ | 385/139 |
| 5,133,583 A * | 7/1992 | Wagman et al. | ........... | 294/86.42 |
| 5,440,665 A * | 8/1995 | Ray et al. | ........................ | 385/135 |
| 5,491,766 A * | 2/1996 | Huynh et al. | ........................ | 385/100 |
| 5,528,718 A * | 6/1996 | Ray et al. | ........................ | 385/136 |
| 5,657,413 A * | 8/1997 | Ray et al. | ........................ | 385/139 |
| 6,101,305 A * | 8/2000 | Wagman et al. | ........... | 385/113 |
| 6,266,469 B1 | 7/2001 | Roth | ........................ | 385/136 |
| 6,974,169 B1 * | 12/2005 | Upton | ........................ | 294/86.42 |
| 6,993,237 B2 * | 1/2006 | Cooke et al. | ........................ | 385/135 |
| 8,009,957 B2 * | 8/2011 | Utz et al. | ........................ | 385/136 |
| 2002/0133150 A1 * | 9/2002 | Whayne et al. | ........................ | 606/41 |
| 2005/0111811 A1 * | 5/2005 | Cooke et al. | ........................ | 385/136 |
| 2007/0280621 A1 * | 12/2007 | Livingston et al. | ........... | 385/139 |
| 2008/0175548 A1 | 7/2008 | Knecht et al. | ........................ | 385/100 |
| 2008/0317415 A1 * | 12/2008 | Hendrickson et al. | ........... | 385/77 |
| 2009/0136184 A1 * | 5/2009 | Abernathy et al. | ........... | 385/80 |
| 2010/0054676 A1 | 3/2010 | Cooke et al. | ........................ | 385/100 |
| 2010/0220969 A1 | 9/2010 | Utz et al. | ........................ | 385/136 |
| 2012/0301090 A1 * | 11/2012 | Cline et al. | ........................ | 385/103 |
| 2012/0308184 A1 * | 12/2012 | Pina et al. | ........................ | 385/102 |
| 2012/0328253 A1 * | 12/2012 | Hurley et al. | ........................ | 385/103 |
| 2013/0016948 A1 * | 1/2013 | Smith et al. | ........................ | 385/100 |
| 2013/0074303 A1 * | 3/2013 | Durrant et al. | ........... | 29/402.14 |
| 2013/0134370 A1 * | 5/2013 | Leonard et al. | ........ | 254/134.3 R |

FOREIGN PATENT DOCUMENTS

JP 2002-333561 A 11/2002 ............... G02B 6/44

OTHER PUBLICATIONS

Patent Cooperation Treaty, International Search Report, Oct. 31, 2012, 3 pages.

* cited by examiner

*Primary Examiner* — Rhonda Peace

(57) ABSTRACT

Methods of preparing strength member pulling members in fiber optic cable furcations and related components, assemblies, and fiber optic cables are disclosed. To allow fiber optic cables to be pulled without damaging optical fiber(s) disposed therein, a strength member pulling loop is formed from a strength member disposed inside the fiber optic cable. A pulling cord can be disposed in the strength member pulling loop to pull the fiber optic cable. The pulling load applied to the pulling cord is translated to the strength member pulling loop, which is translated to the strength member disposed inside the fiber optic cable. In this manner, when the fiber optic cable is pulled, the pulling load is translated to the strength member disposed inside the fiber optic cable to prevent or avoid damaging the optical fiber(s) disposed inside the fiber optic cable.

32 Claims, 18 Drawing Sheets

METHODS OF PREPARING STRENGTH MEMBER PULLING MEMBERS IN FIBER OPTIC CABLE FURCATIONS AND RELATED COMPONENTS, ASSEMBLIES, AND FIBER OPTIC CABLES

BACKGROUND

1. Field of the Disclosure

The technology of the disclosure relates to methods of preparing pulling members in fiber optic cable furcations, and related components, assemblies, and cables. The pulling members are configured to direct at least part of a pulling load on non-medium components of a fiber optic cable.

2. Technical Background

Benefits of optical fiber use include extremely wide bandwidth and low noise operation. Because of these advantages, optical fiber is increasingly being used for a variety of applications, including but not limited to broadband voice, video, and data transmission. As a result, fiber optic communications networks include a number of interconnection points at which multiple optical fibers are interconnected. To install cable assembly between these interconnection points in the network it is often required for the craft to pull the cable assemblies under floors, through chases or ducts, or navigate other tight quarters.

In order to cost effectively and rapidly deploy an optical communications network, it is desirable to terminate the optical fibers of distribution cables in a controlled factory environment. The fiber optic connectors terminated to the distribution cable are typically preconnectorized by being housed in a connector plug or in a compatible connector jack configured to receive the connector plug. As used herein, the term "pre-connectorized fiber optic cable" refers to a communications cable including at least one optical fiber that is terminated to a fiber optic connector prior to installing the fiber optic cable at a service location, commonly referred to as a "customer premises." Preconnectorized distribution cables permit the optical fibers to be interconnected with optical fibers of other preconnectorized optical cables and to connection terminals without removing the jacket of the distribution cable, and thereby exposing the optical fibers to adverse environmental conditions, such as moisture, dirt, or dust.

Use of preconnectorized distribution cables in a fiber optic communications network can present certain challenges. For example, a terminated end of the distribution cable often times must be pulled to a desired location during installation, such as to a connection terminal (e.g., a fiber distribution hub (FDH)) or to another distribution cable, through relatively small diameter conduits. Moreover, these preconnectorized cable assemblies must be protected during installation such as when pulling the same into position.

Accordingly, a terminated end of the distribution cable can be provided within a pulling grip. A furcation plug of a fiber optic assembly and furcated legs extending from the furcation plug are placed inside the pulling grip prior to pulling. When pulled, the pulling grip is capable of transferring a pulling load to the cable jacket of the fiber optic cable without inducing relative movement between the furcated legs, the furcation plug, and the fiber optic cable. However, even with the transfer of pulling load to the cable jacket of the fiber optic cable, a portion of the pulling load may be transferred to the components disposed inside the fiber optic cable, including the optical fiber. Transferring any load to an optical fiber disposed in a fiber optic cable during the pulling of a fiber optic cable could damage the optical fiber.

SUMMARY OF THE DETAILED DESCRIPTION

Embodiments disclosed in the detailed description include methods of preparing strength member pulling members in fiber optic cable furcations and related components, assemblies, and fiber optic cables. To allow fiber optic cables to be pulled without damaging optical fiber(s) disposed therein, a strength member pulling loop is formed from a strength member disposed inside the fiber optic cable. A pulling cord can be disposed in the strength member pulling loop to pull the fiber optic cable. The pulling load applied to the pulling cord is translated to the strength member pulling loop, which is translated to the strength member disposed inside the fiber optic cable. In this manner, when the fiber optic cable is pulled, the pulling load is translated to the strength member disposed inside the fiber optic cable to prevent or avoid damaging the optical fiber(s) disposed inside the fiber optic cable.

In this regard in one embodiment, a method of preparing a strength member pulling loop assembly in a fiber optic cable furcation is provided. This method includes removing a portion of a cable jacket from an end portion of a fiber optic cable to expose end portions of one or more optical fibers and an end portion of a strength member from the cable jacket. This method also includes forming a strength member loop by disposing a first end of the strength member end portion back towards the cable jacket to place a loop portion in the strength member end portion. This method also includes securing the first end of the strength member end portion to form a strength member pulling loop.

This method can also include several options. As non-limiting examples, the strength member end portion can be secured onto the cable jacket of the fiber optic cable or inside a furcation plug. For example, the method can include the option of disposing the strength member end portion in at least one tube before forming the strength member loop. The tube can comprise heat shrink tube that can be heat shrunk around the strength member end portion to provide the strength member loop. Alternatively, this method can include the option of disposing the first end of the strength member end portion in a first tube, and disposing the first end of the strength member end portion through a second tube after disposing the strength member end portion through the first tube, before forming the strength member loop. The option can include disposing the first end of the strength member end portion back through a first tube portion in the first tube to form a neck portion from the first tube and dispose the loop portion in the second tube, and disposing the first end of the strength member end portion back towards the cable jacket.

In another embodiment, a fiber optic cable assembly is provided. This fiber optic cable assembly comprises a fiber optic cable comprising one or more optical fibers and a strength member disposed inside a cable jacket. This fiber optic cable assembly also comprises an end portion of the fiber optic cable comprising end portions of one or more end portions of the one or more optical fibers exposed from the cable jacket and an end portion of the strength member exposed from the cable jacket. This fiber optic cable assembly also comprises a strength member pulling loop. The strength member pulling loop comprises a strength member loop formed from a first end of the strength member end portion disposed back towards the cable jacket to place a loop portion in the strength member end portion. This strength member pulling loop also comprises a securing component securing the first end of the strength member end portion.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown.

Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include methods of preparing strength member pulling members in fiber optic cable furcations and related components, assemblies, and fiber optic cables. To allow fiber optic cables to be pulled without damaging optical fiber(s) disposed therein, a strength member pulling loop is formed from a strength member disposed inside the fiber optic cable. A pulling cord can be attached to the strength member pulling loop to pull the fiber optic cable and then removed once the assembly is installed. The pulling load applied to the pulling cord is translated to the strength member pulling loop, which is translated to the strength member disposed inside the fiber optic cable. In this manner, when the fiber optic cable is pulled, the pulling load is translated to the strength member disposed inside the fiber optic cable to prevent or avoid damaging the optical fiber(s) disposed inside the fiber optic cable.

Figure 1:
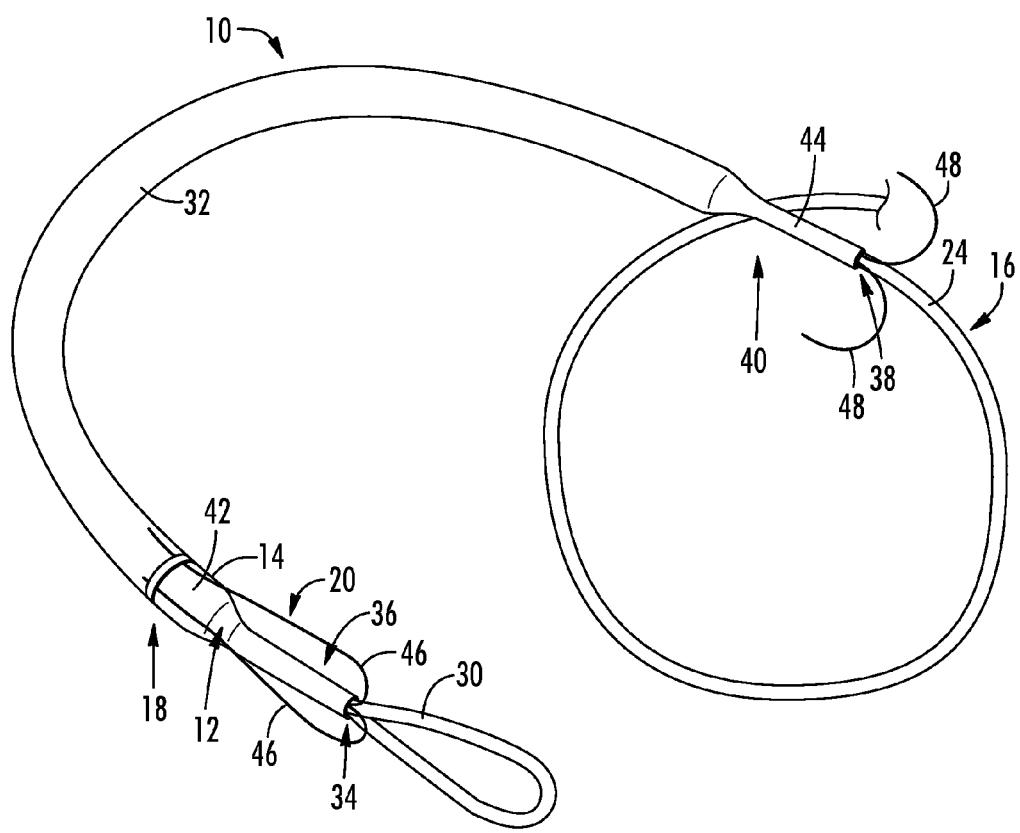
FIG. 1 is a schematic diagram of an exemplary assembled pulling grip assembly including a strength member pulling loop assembly.
Figure 2:
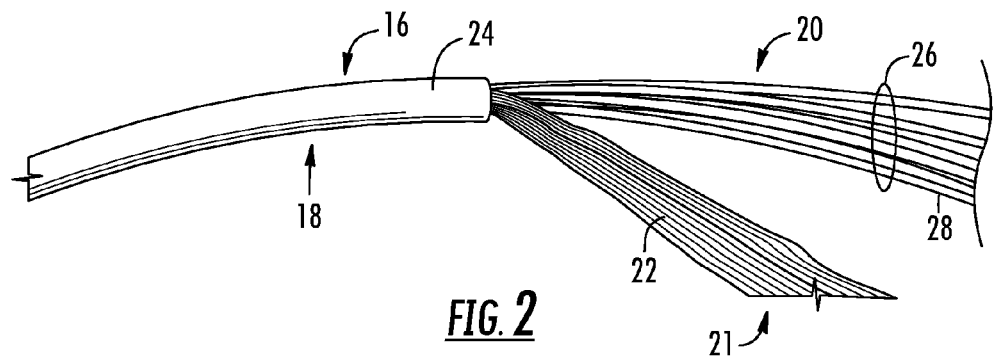
FIG. 2 illustrates an end portion of an exemplary fiber optic cable in FIG. 1 cut to a desired length with a portion of a cable jacket removed to expose end portions of optical fibers ("optical fiber end portions") and end portions of strength members ("strength member end portions") disposed inside the cable jacket.

FIG. 1 illustrates is a schematic diagram of an exemplary assembled pulling grip assembly 10 that includes a strength member pulling loop assembly 12. The strength member pulling loop assembly 12 includes a strength member loop that is hidden inside a cable jacket tube 14 in the illustration of the pulling grip assembly 10 in FIG. 1. The strength member pulling loop assembly 12 is prepared according to the method illustrated in FIGS. 2-12 discussed below. With reference to FIG. 1, the strength member pulling loop assembly 12 includes a fiber optic cable 16. As illustrated in FIG. 2, an end portion 18 of the fiber optic cable 16 is comprised of one or more optical fibers 20 (referred to as "optical fibers 20") and an end portion 21 of a strength member 22 disposed inside a cable jacket 24. As will be discussed herein and illustrated in FIGS. 2-12, a strength member loop is formed from the end portion 21 (also referred to as "strength member end portion 21") to allow the fiber optic cable 16 to be pulled. The pulling load is translated to the strength member 22 to protect the optical fibers 20. As a non-limiting example, the strength member 22 may be manufactured from Aramid, such as Kevlar®. For example, the ability of the fiber optic cable 16 to withstand a certain pulling load may be required. As one non-limiting example, the pulling load requirement may be up to one hundred (100) pounds or one hundred fifty (150) pounds. In this embodiment, the optical fibers 20 are disposed in one or more optical fiber sub-units 26. Each optical fiber sub-unit 26 is comprised of an outer tube 28 with one or more optical fibers 20 disposed therein. Any number of optical fiber sub-units 26 and optical fibers 20 disposed therein may be provided.

With reference back to FIG. 1, a pulling cord 30 is secured to the strength member loop prepared from the strength member end portion 21 of the strength member 22 to apply the pulling load to the strength member loop to pull the fiber optic cable 16. A pulling bag 32 is disposed around the strength member loop and the end portion 18 of the fiber optic cable 16 to form the pulling grip assembly 10 and protect the end portion 18 of the fiber optic cable 16 and any exposed optical fibers 20 during pulling. The pulling cord 30 is disposed through a first opening 34 on a first end 36 of the pulling bag 32. The end portion 18 of the fiber optic cable 16 is disposed through a second opening 38 on a second end 40 of the pulling bag 32. To secure the pulling bag 32 around the end portion 18 of the fiber optic cable 16 during pulling, a first heat shrink tube 42 is disposed around the first end 36 of the pulling bag 32 and a second heat shrink tube 44 is disposed around the second end 40 of the pulling bag 32. The first and second heat shrink tubes 42, 44 are heat shrunk to secure the pulling bag 32 to the cable jacket 24 of the fiber optic cable 16. After pulling, the first and second heat shrink tubes 42, 44 can be removed to provide access to the exposed optical fibers 20. For example, one or more rip cords 46, 48 may be inserted through the first opening 34 and the second opening 38 inside the first and second heat shrink tubes 42, 44, respectively, as illustrated in FIG. 1. The rip cords 46, 48 can be pulled to rip through the heat shrink tubes 42, 44.

FIGS. 2-12 will now be described regarding an exemplary method of preparing of a strength member loop and the strength member pulling loop assembly 12 in the end portion 18 of the fiber optic cable 16 in FIG. 1. As illustrated in FIG. 2, the method includes removing an end portion of the cable jacket 24 from the end portion 18 of the fiber optic cable 16 to expose end portions of the optical fiber sub-units 26 and the strength member end portion 21 from the cable jacket 24. As a non-limiting example, twenty-four (24) to twenty-seven (27) inches of the cable jacket 24 may be removed from the end portion 18 of the fiber optic cable 16. A ring cutter may be used to remove the end portion of the cable jacket 24 from the end portion 18 of the fiber optic cable 16. After the end portion of the cable jacket 24 is removed, the strength member 22 and optical fibers 20 may be separated, as illustrated in FIG. 2.

Figure 3:
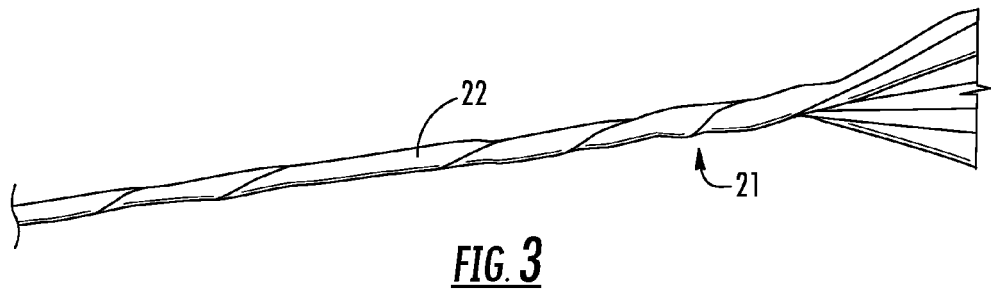
FIG. 3 illustrates the exposed strength member end portion in FIG. 2 twisted and taped.
Figure 4:
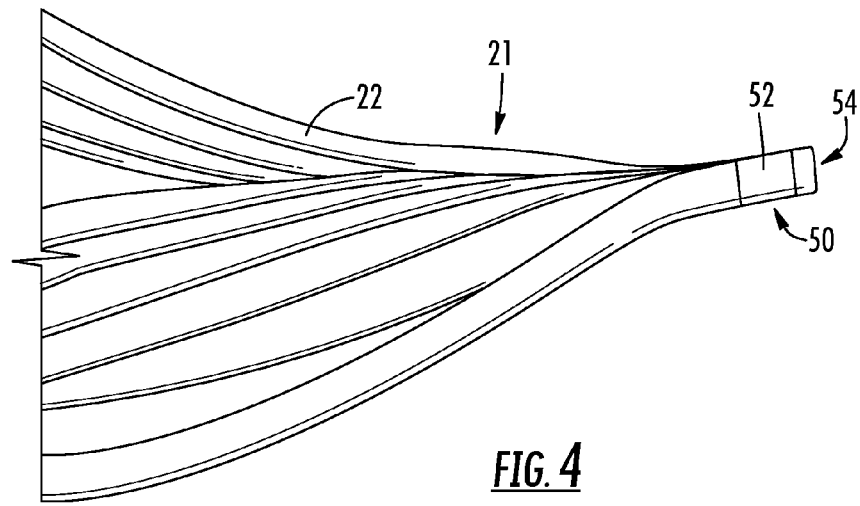
FIG. 4 illustrates the twisted and taped strength member end portion in FIG. 3 cut to the desired length.

Before a strength member loop is formed in the strength member end portion 21, the strength member end portion 21 may optionally be twisted as illustrated in FIG. 3. Twisting the strength member end portion 21 may more easily push the strength member end portion 21 through a strength member tube, as discussed in more detail below, when forming the strength member loop. To prevent the twist disposed in the strength member end portion 21 from unraveling, a portion 50 of the strength member 22 can be secured with tape 52 or other securing means, as illustrated in FIG. 4. As an option, the strength member 22 may be taped to a rod to secure the strength member 22 prior to taping or securing the portion 50. A first end 54 of the strength member end portion 21 adjacent the tape 52 can then be cut to provide the strength member end portion 21 in the desired length prior to forming the strength member loop.

Figure 5:
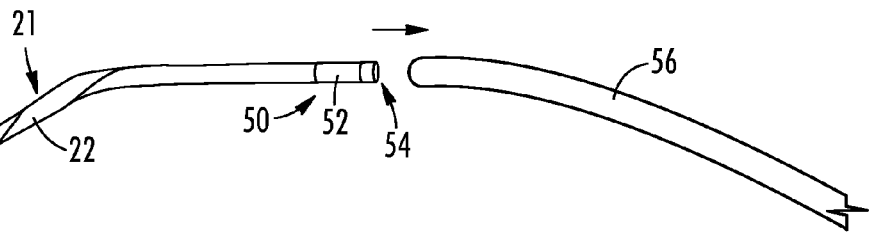
FIG. 5 illustrates preparing to insert the strength member end portion in FIG. 4 into a heat shrink tube.
Figure 6:
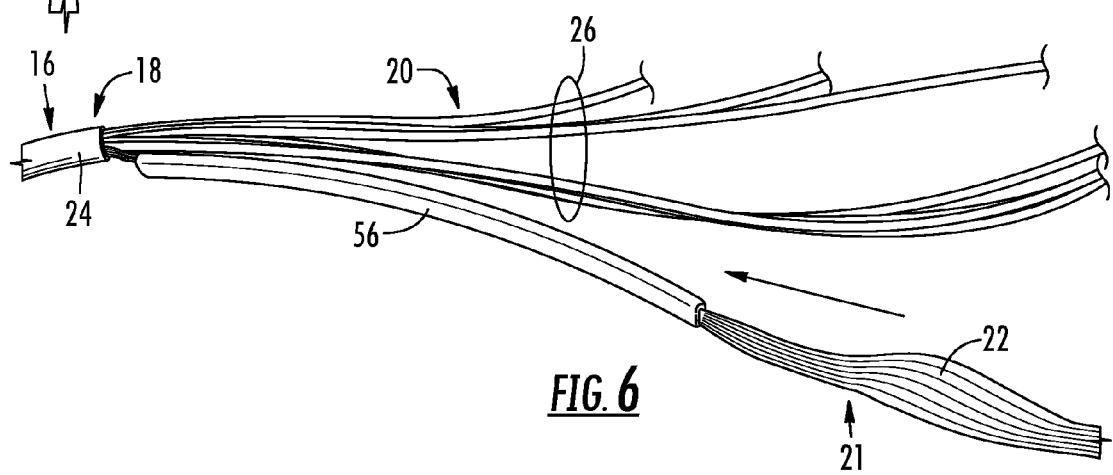
FIG. 6 illustrates pushing the strength member end portion through the heat shrink tube in FIG. 5 and pushing the heat shrink tube to the cable jacket on the fiber optic cable illustrated in FIG. 2.

Before forming the strength member loop from the strength member end portion 21, it may be desired to optionally dispose the strength member end portion 21 into a strength member tube 56, as illustrated in FIGS. 5 and 6. The strength member tube 56 may serve to protect the strength members 22 from damage when a pulling load is placed on the strength member loop formed from the strength member end portion 21. For example, the strength member tube 56 may be a heat shrink tube that is heat shrunk around the strength member end portion 21 to firmly secure the strength member tube 56 around the strength member end portion 21. FIG. 5 illustrates the strength member end portion 21 from FIG. 4 prior to being inserted into the strength member tube 56. FIG. 6 illustrates disposing the strength member tube 56 over the strength member end portion 21 and sliding the strength member tube 56 back towards the end portion 18 of the fiber optic cable 16. Providing the strength member tube 56 is optional. For example as discussed below and illustrated in FIG. 12, the strength member end portion 21 is not disposed in a strength member tube prior to forming the strength member loop.

Figure 7:
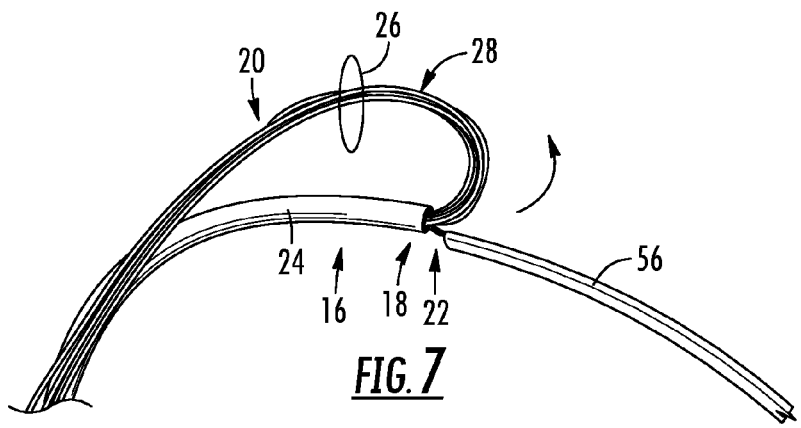
FIG. 7 illustrates heating the heat shrink tube with the strength member end portion disposed therethrough in FIG. 6.

FIG. 7 illustrates the strength member tube 56 after being heat shrunk onto the strength member end portion 21. As one non-limiting example, the strength member tube 56 in FIGS. 5 and 6 may be heated to a temperature between 100 and 200 degrees Celsius for between two (2) and four (4) minutes to heat shrink and secure the strength member tube 56 to the strength member end portion 21. The optical fiber sub-units 26 can be bent back towards the cable jacket 24 as illustrated in FIG. 7 to prepare for forming a strength member loop from the strength member end portion 21.

Figure 8:
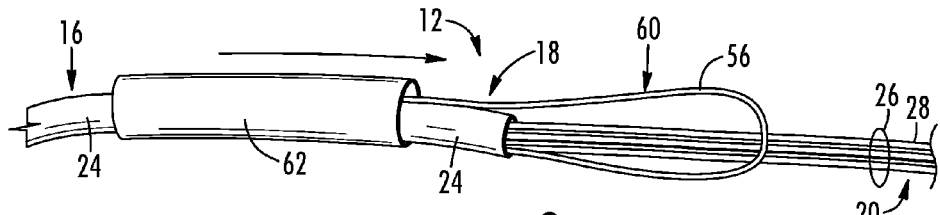
FIG. 8 illustrates making a loop of the heat shrunk strength member end portion ("strength member loop") in FIG. 7 and pulling a cable jacket heat shrink tube over the strength member loop.
Figure 9:
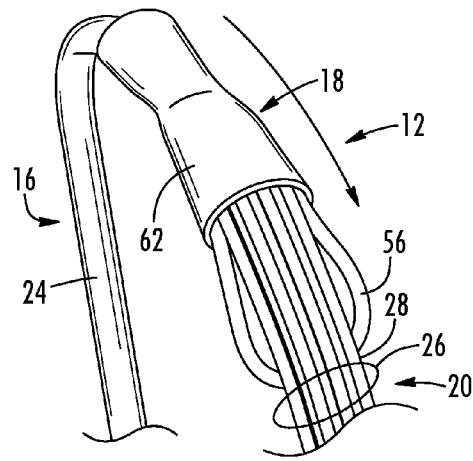
FIG. 9 illustrates the cable jacket heat shrink tube in FIG. 8 heat shrunk over the cable jacket and the strength member loop to form a strength member pulling loop.

FIG. 8 illustrates making a strength member loop 60 of the heat shrunk strength member end portion 21 in FIG. 7 to provide the strength member pulling assembly 12 in the pulling loop assembly 10 in FIG. 1. As illustrated in FIG. 8, the strength member loop 60 is formed by looping the first end 54 of the strength member end portion 21 back onto itself and towards the cable jacket 24 of the fiber optic cable 16. In this manner, the strength member loop 60 can be pulled to pull the fiber optic cable 16, wherein the pulling load directed on the strength member loop 60 is translated to the strength member 22 disposed inside the fiber optic cable 16. Any size of strength member loop 60 may be formed as desired. As one non-limiting example, the strength member loop 60 may be two (2) to three (3) inches in circumference. The first end 54 of the strength member end portion 21 is secured to the cable jacket 24 to secure the formation of the strength member loop 60 in this embodiment. In this regard, a cable jacket tube 62 is provided as illustrated in FIGS. 8 and 9. FIG. 8 illustrates the cable jacket tube 62 before being heat shrunk onto the strength member loop 60 and the cable jacket 24 of the fiber optic cable 16. FIG. 9 illustrates the cable jacket tube 62 after being heat shrunk onto the strength member loop 60 and the cable jacket 24 of the fiber optic cable 16.

With reference to FIG. 8, the cable jacket tube 62 is disposed over the first end 54 of the strength member end portion 21 and the end portion 18 of the fiber optic cable 16 before the strength member loop 60 is secured. The first end 54 of the strength member end portion 21 is looped back towards the cable jacket 24 and disposed inside the cable jacket tube 62. For example, the cable jacket tube 62 may be a heat shrink tube. In this regard, the cable jacket tube 62 is heated to heat shrink the cable jacket tube 62 onto the first end 54 of the strength member end portion 21 and the cable jacket 24 at the end portion 18 of the fiber optic cable 16 to secure the formed strength member loop 60, as illustrated in FIG. 9. The cable jacket tube 62 may also serve as a boot to provide flexural strain relief to the strength member pulling loop assembly 12. As one non-limiting example, the strength member pulling assembly 12 in FIG. 8 may be heated to a temperature between 100 and 200 degrees Celsius for between two (2) and four (4) minutes to heat shrink and secure the cable jacket tube 62 to the strength member end portion 21 and the cable jacket 24.

Figure 10:
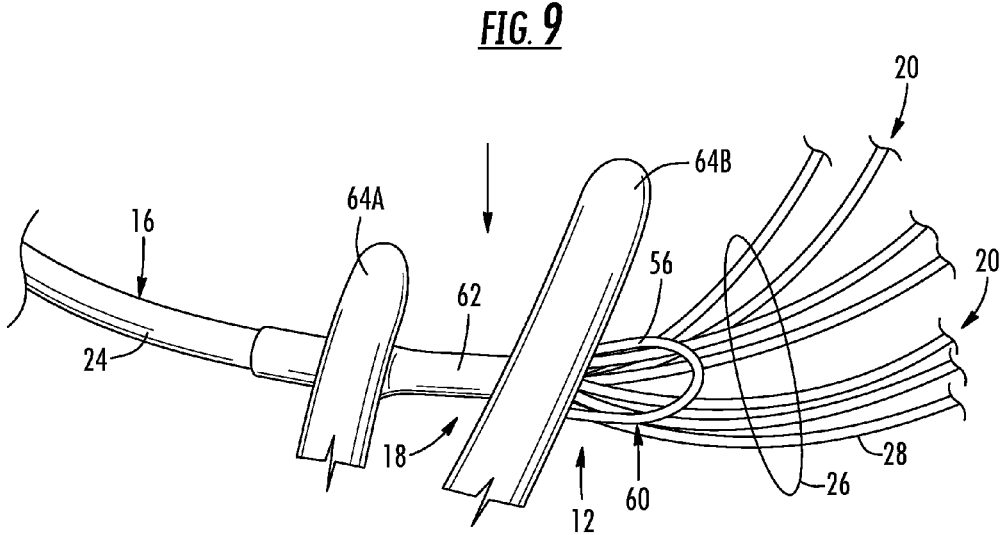
FIG. 10 illustrates pressing the cable jacket heat shrink tube in FIG. 9 on the cable jacket and the strength member pulling loop to assist in glue bonding adhesion.

As illustrated in FIG. 10, a pressing force may be applied to the cable jacket tube 62 using pressing members 64A, 64B or other members to promote adhesion between the cable jacket tube 62 and the first end 54 of the strength member end portion 21 to secure the strength member loop 60 to the cable jacket 24. For example, the cable jacket tube 62 may be lined with glue or other adhesive to further bond the strength member end portion 21 to the cable jacket tube 62.

Figure 11:
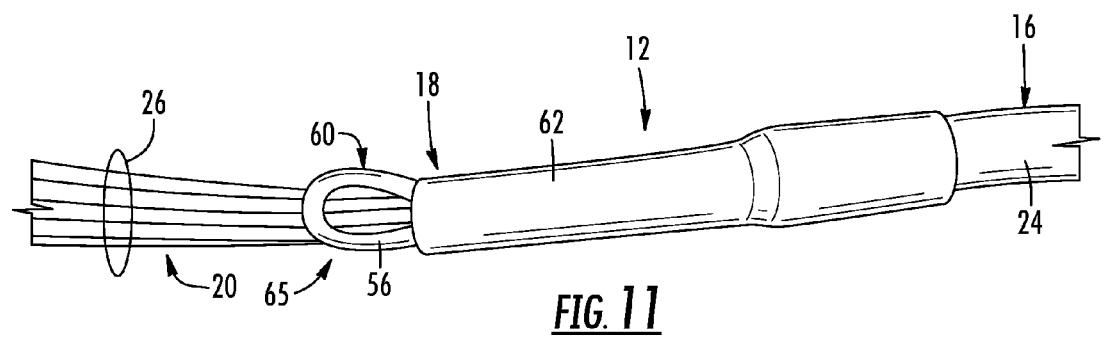
FIG. 11 illustrates the strength member pulling loop assembly in FIG. 10 fully assembled.

FIG. 11 illustrates the strength member pulling loop assembly 12 in FIG. 10 fully assembled. In this regard, a strength member pulling loop 65 is formed by the cable jacket tube 62 securing the strength member loop 60 to the cable jacket 24. Moreover, the strength member loop 60 is disposed adjacent to a furcation location of the cable assembly (i.e., near the fiber optic cable furcation where the cable transitions into optical fiber sub-units 26). In this manner, a pulling load can be placed on the strength member loop 60 of the strength member pulling loop 65 to pull the fiber optic cable 16. By the pulling load being placed on the strength member loop 60 formed from the cable jacket tube 62, the pulling load is translated directly to the strength member 22 disposed inside the cable jacket 24 of the fiber optic cable 16. The pulling load is not directly translated to the optical fibers 20 disposed in the fiber optic cable 16. In one embodiment, none of the pulling load disposed in the strength member loop 60 is translated to the optical fibers 20 in the fiber optic cable 16.

Figure 12:
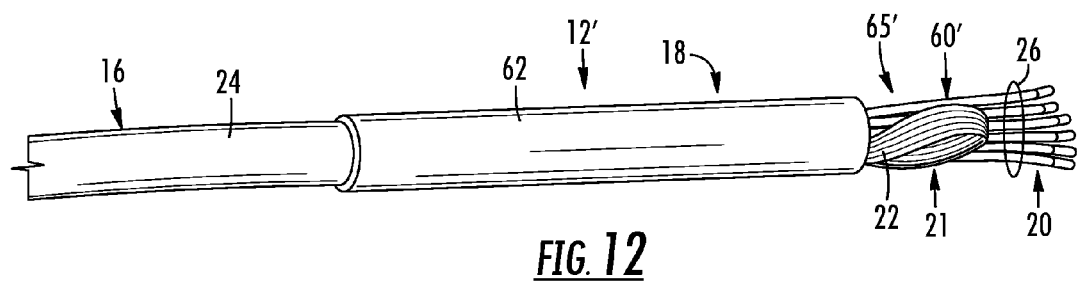
FIG. 12 illustrates an alternate assembled strength member pulling loop assembly, wherein the strength member end portion is not disposed in a strength member tube.

FIG. 12 illustrates an alternate assembled strength member pulling loop assembly 12' that has the same components as the strength member pulling assembly 12 in FIG. 11, except that the strength member end portion 21 is not disposed inside a strength member tube during strength member loop preparations. A strength member loop 60' is formed from the strength member end portion 21 without being disposed in a tube to form an alternate strength member pulling loop 65'.

Figure 13A:
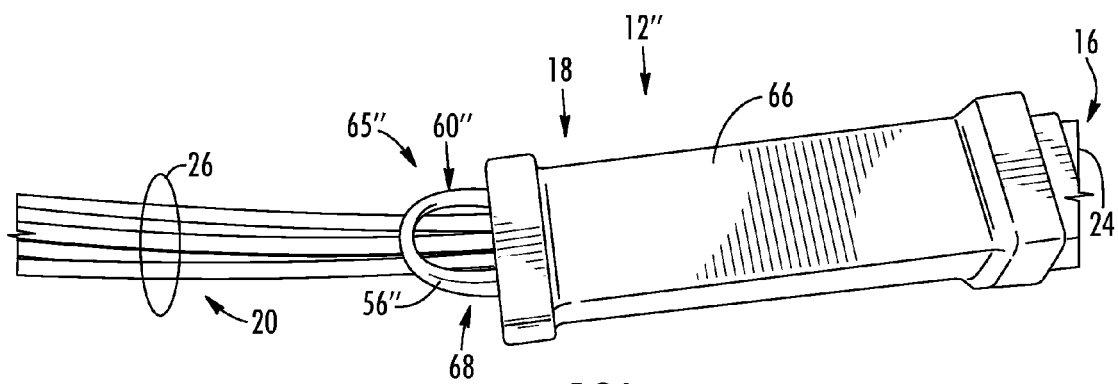
FIG. 13A illustrates an alternate assembled strength member pulling loop assembly formed by disposing a strength member end portion in a furcation plug.
Figure 13B:
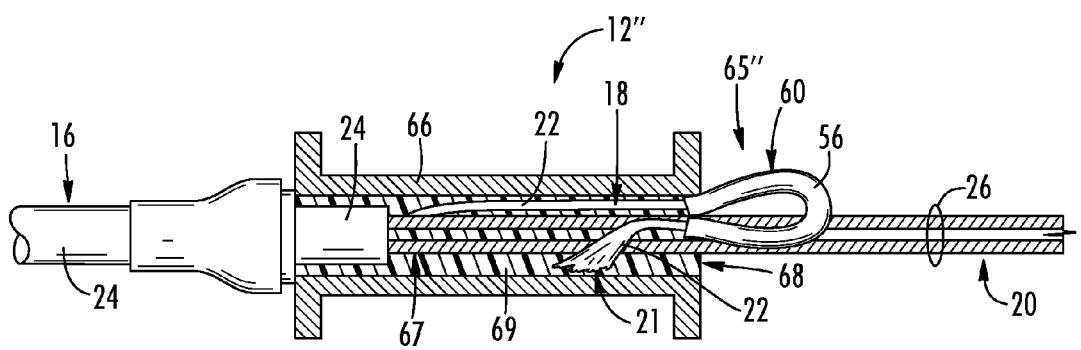
FIG. 13B illustrates a cross-sectional view of the furcation plug in FIG. 13A illustrating the alternate assembled strength member pulling loop assembly in FIG. 13A.

FIG. 13A illustrates an alternate assembled strength member pulling loop assembly 12". FIG. 13B illustrates a cross-sectional view of the assembled strength member pulling loop 12" in FIG. 13A. In this embodiment, the strength member pulling loop assembly 12" includes the same components as the strength member pulling loop assembly 12 in FIG. 11, except that the strength member end portion 21 is not secured onto the cable jacket 24 by the cable jacket tube 62 as discussed in embodiments above. Instead, the strength member end portion 21 is secured inside a furcation plug 66 to form the strength member loop 60 to provide an alternate strength member pulling loop 65".

As illustrated in FIGS. 13A and 13B, the furcation plug 66 is provided to receive the end portion 18 of the fiber optic cable 16. The optical fiber sub-units 26 are broken out from the cable jacket 24 inside an internal chamber 67 in the furcation plug 66 as a result of cutting the fiber optic cable 16, as illustrated in FIG. 2. For example, the end portion 18 of the fiber optic cable 16 may be completely disposed through the internal chamber 67 and an end 68 of the furcation plug 66. The end portion 18 of the fiber optic cable 16 may then be cut to expose the optical fiber sub-units 26 and strength member 22. Then, as illustrated in FIG. 13B, the end portion 18 of the fiber optic cable 16 may be retracted back towards the end 68 and into the internal chamber 67 with portions of the exposed optical fiber sub-units 26 and strength member 22 contained both inside the internal chamber 67 of the furcation plug 66 and exposed outside of the internal chamber 67 of the furcation plug 66. A potting compound 69 can then be disposed in the internal chamber 67 of the furcation plug 66 to secure the end portion 18 of the fiber optic cable 16 and the optical fiber sub-units 26. Before the potting compound 69 is disposed in the internal chamber 67, the strength member end portion 21 is looped back inside the internal chamber 67, as illustrated in FIG. 13B. The potting compound 69 is then inserted into the internal chamber 67 to secure the end portion 18 of the fiber optic cable 16 and the strength member end portion 21 to form the strength member loop 60 comprised of the strength member 22 disposed in the strength member tube 56 and the strength member pulling loop 65".

FIGS. 14-21B illustrate another exemplary method of preparing of a strength member loop and the strength member pulling loop assembly in an end portion of a fiber optic cable. In this exemplary method, as will be described below, the strength member loop is formed by a strength member end portion disposed in two strength member tubes to form an additional neck portion in the strength member loop. Providing a neck portion in a strength member loop may assist in translating a pulling load applied to the strength member loop in alignment with the longitudinal axis of the strength member disposed inside a fiber optic cable. This may allow a greater pulling load to be applied to the strength member end portion. In the strength member loop 60, 60' in the strength member pulling assemblies 12, 12' in FIGS. 2-12, because a neck portion is not provided in the strength member loop 60, 60', the pulling load may cause the strength member 22 to pull out towards the cable jacket 24, thus adding strain to the cable jacket 24.

Figure 14:
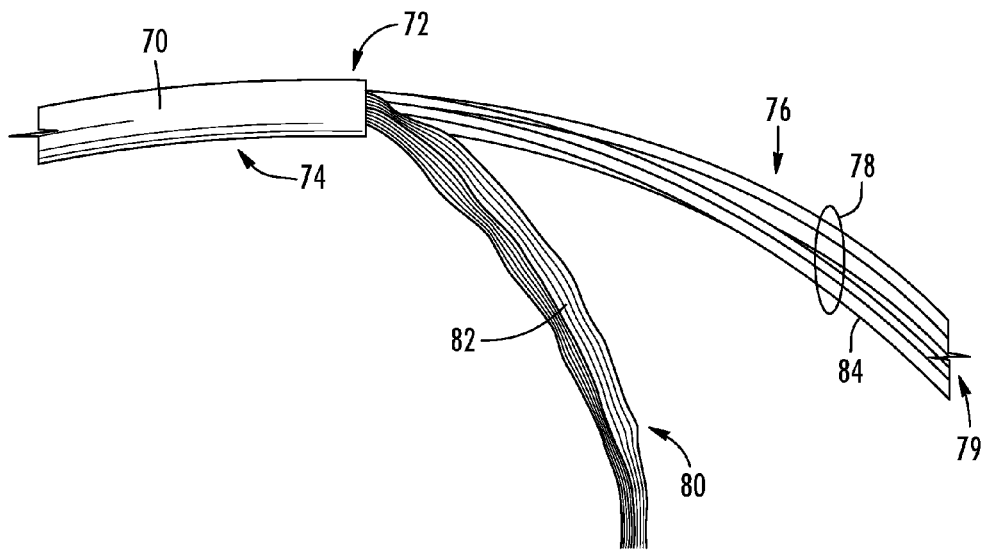
FIG. 14 illustrates an end portion of another exemplary fiber optic cable cut to a desired length with a portion of the cable jacket removed to expose end portions of optical fibers ("optical fiber end portions") and end portions of strength members ("strength member end portions") disposed inside the cable jacket.

In this regard as illustrated in FIG. 14, the method includes removing an end portion of a cable jacket 70 from an end portion 72 of a fiber optic cable 74 to expose end portions 76 of optical fiber sub-units 78, each containing one or more optical fibers 79, and an end portion 80 of strength member 82 ("strength member end portion 80") from the cable jacket 70. As a non-limiting example, twenty-four (24) to twenty-seven (27) inches of the cable jacket 70 may be removed from the end portion 72 of the fiber optic cable 74. A ring cutter may be used to remove the end portion of the cable jacket 70 from the end portion 72 of the fiber optic cable 74. After the end portion of the cable jacket 70 is removed, the strength member 82 and optical fibers sub-units 78 may be separated, as illustrated in FIG. 14.

As will be discussed herein and illustrated in FIGS. 15-21B, a strength member loop is formed from the strength member end portion 80 to allow the fiber optic cable 74 to be pulled. The pulling load is translated to the strength member 82 to protect the optical fibers 79. As a non-limiting example, the strength member 82 may be manufactured from Aramid, such as Kevlar®. In this embodiment, the optical fibers 79 are disposed in the one or more optical fiber sub-units 78. Each optical fiber sub-unit 78 is comprised of an outer tube 84 with the one or more optical fibers 79 disposed therein. Any number of optical fiber sub-units 78 and optical fibers 79 disposed therein may be provided.

Before a strength member loop is formed in the strength member end portion 80, the strength member end portion 80 may optionally be twisted, such as previously illustrated in the strength member end portion 21 in FIG. 3 as an example. Twisting the strength member end portion 80 may more easily push the strength member end portion 80 through one or more strength member tubes, as discussed in more detail below, when forming the strength member loop. To prevent the twist disposed in the strength member end portion 80 from unraveling, a portion of the strength member 82 can be secured with tape or other securing means, like the strength member end portion 21 illustrated in FIG. 4 as an example. Any excess length of the strength member end portion 80 can be cut to a desired length before forming the strength member loop.

Figure 15:
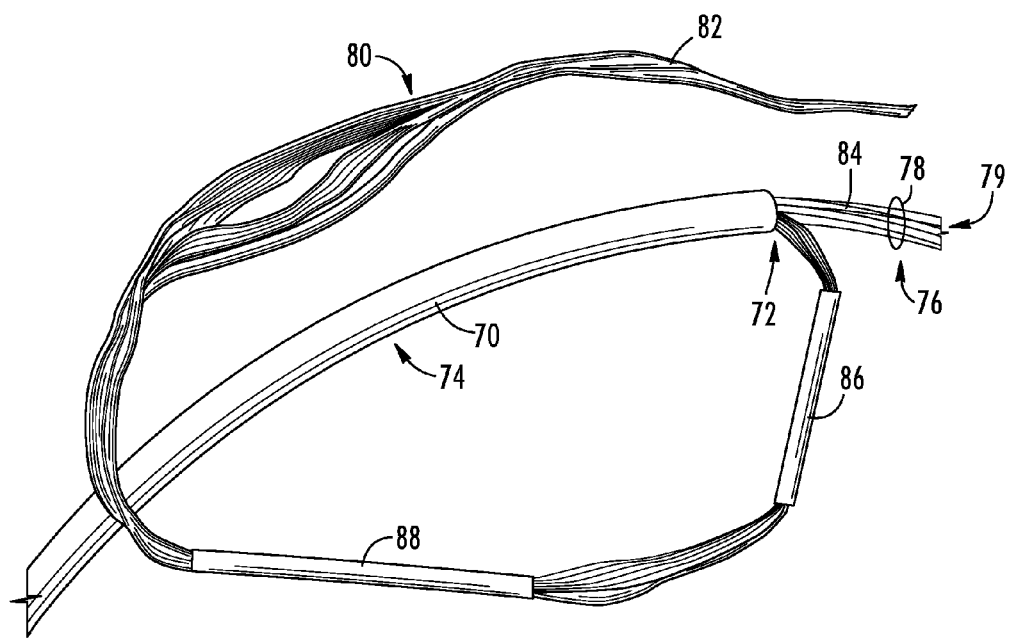
FIG. 15 illustrates inserting the exposed strength member end portion in FIG. 14 inserted into first and second heat shrink tubes.

Before forming the strength member loop from the strength member end portion 80, it may be desired to dispose the strength member end portion 80 into two (2) strength member tubes 86, 88, as illustrated in FIG. 15. The strength member tubes 86, 88 may serve to protect the strength members 82 from damage when a pulling load is placed on the strength member loop formed from the strength member end portion 80. For example, the strength member tubes 86, 88 may be heat shrink tubes that can be heat shrunk around the strength member end portion 80 to firmly secure the strength member tubes 86, 88 around the strength member end portion 80. FIG. 15 illustrates disposing the strength member tubes 86, 88 over the strength member end portion 80. As will be described below with regard to FIG. 16, by disposing two strength member tubes 86, 88 over the strength member end portion 80, a neck portion can be disposed in a strength member loop formed from the strength member end portion 80 by the strength member tube 86. A loop portion can be disposed in the strength member loop formed from the strength member end portion 80 by the strength member tube 88.

Figure 16:
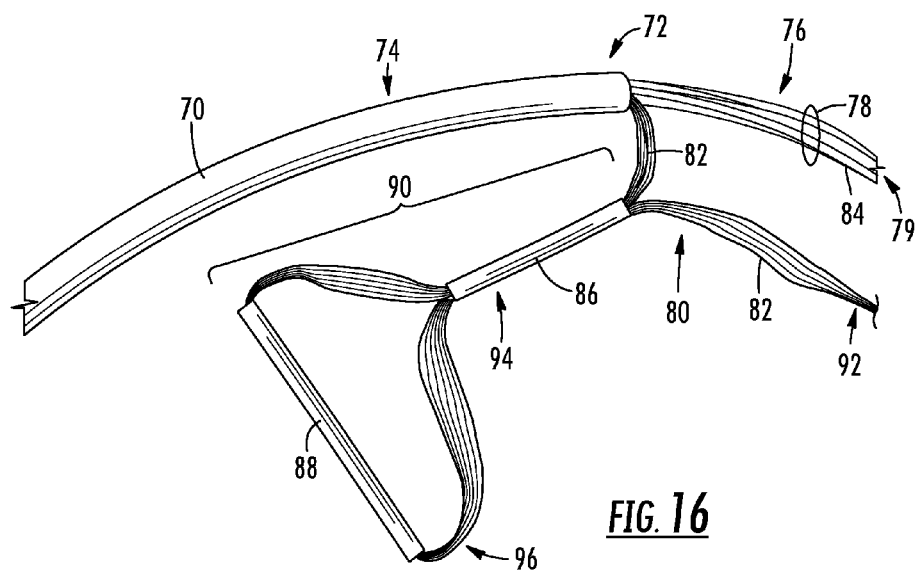
FIG. 16 illustrates looping the strength member end portion back through the first heat shrink tube in FIG. 15 adjacent to the cable jacket of the fiber optic cable in FIG. 14.
Figure 17:
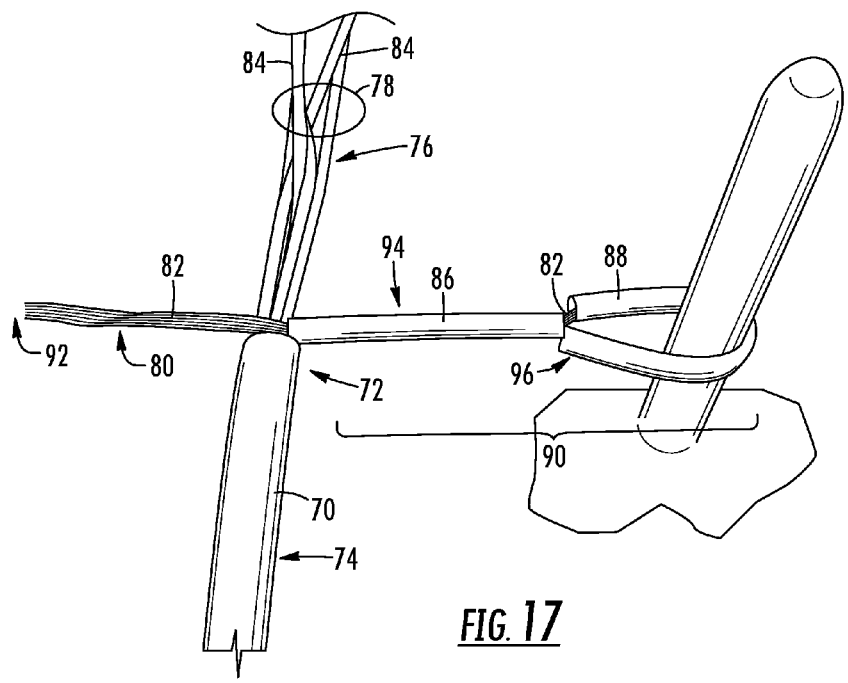
FIG. 17 illustrates pulling the strength member end portion through the first and second heat shrink tubes in FIG. 16 to form a strength member pulling loop having a neck portion in the fiber optic cable in FIG. 14.

FIG. 16 illustrates a strength member pulling loop 90 formed in the strength member end portion 80. The strength member pulling loop 90 is formed by disposing a first end 92 of the strength member end portion 80 in the strength member tubes 86, 88, as illustrated in FIG. 16. After the first end 92 of the strength member end portion 80 is disposed through the strength member tubes 86, 88, the first end 92 of the strength member end portion 80 is disposed back through the strength member tube 86 to form a neck portion 94 in the strength member tube 86. By forming the neck portion 94 in the strength member tube 86, a strength member loop or loop portion 96 is formed in the strength member tube 88. Thereafter, the first end 92 of the strength member end portion 80 can be pulled to form the loop portion 96 and reduce any excess strength member 82 exposed between the strength member tubes 86, 88, as illustrated in FIG. 17. This ensures that the majority of the strength member end portion 90 is disposed inside the strength member tubes 86, 88 to protect the strength member 82 disposed therein.

Figure 18:
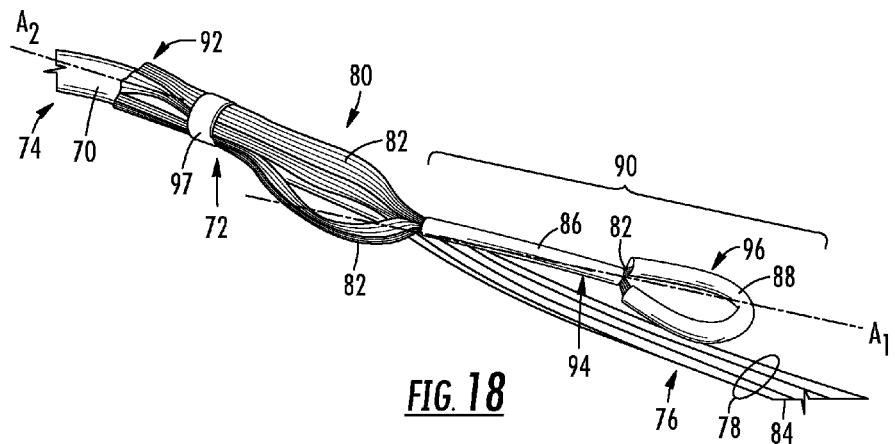
FIG. 18 illustrates the strength member pulling loop in FIG. 17 with the exposed strength member end portion trimmed and fanned around the cable jacket of the fiber optic cable.

The strength member tubes 86, 88 may be heat shrink tubes. In this regard, heat can be applied to the strength member tubes 86, 88 to heat shrink the strength member tubes 86, 88 to be secured in place onto the strength member end portion 80 to form the neck portion 94 and the loop portion 96 in the strength member pulling loop 90, as illustrated in FIG. 18. A pulling load placed on the loop portion 96 is translated to the neck portion 94, which is disposed along a longitudinal axis $A_1$ as illustrated in FIG. 18. Thus, if the neck portion 94 is disposed along a longitudinal axis $A_2$ of the fiber optic cable 74, the pulling load will be directed to the strength member 82 without the strength member 82 applying a force onto or expanding the cable jacket 70. As one non-limiting example, the strength member tube 86, 88 in FIG. 18 may be heated to a temperature between 100 and 200 degrees Celsius for between two (2) and four (4) minutes to heat shrink and secure the strength member tubes 86, 88 to the strength member end portion 80 to form the strength member loop 96. As also illustrated in FIG. 18, the first end 92 of the strength member end portion 80 can be pulled back onto and fanned about the cable jacket 70 of the fiber optic cable 74 to distribute about the first end 92 on the cable jacket 70. The first end 92 of the strength member end portion 80 can be secured to the cable jacket 70, such as with tape 97 or other securing means, as illustrated in FIG. 18.

Figure 19:
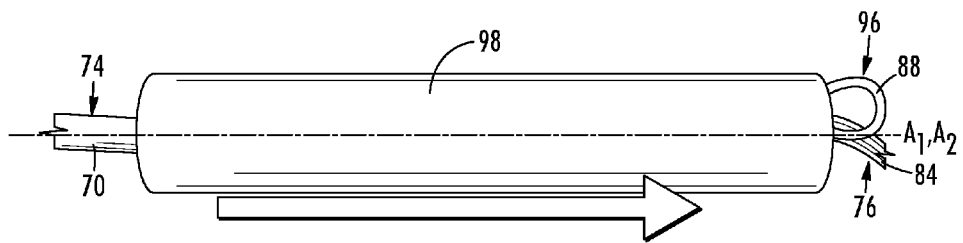
FIG. 19 illustrates disposing a cable jacket heat shrink tube over the strength member pulling loop in FIG. 18 to form an exemplary strength member pulling loop assembly.
Figure 20:
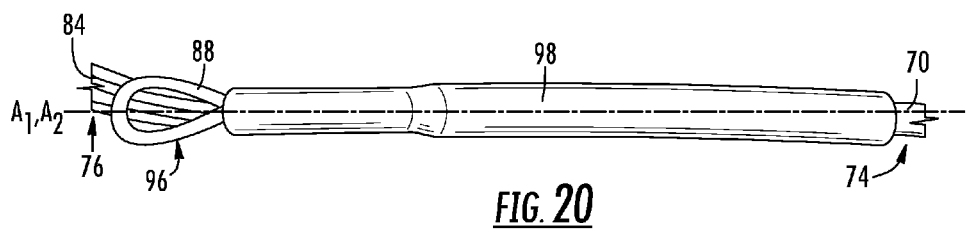
FIG. 20 illustrates the strength member pulling loop assembly in FIG. 19 after exposing the cable jacket heat shrink tube to secure the strength member pulling loop to the cable jacket.

With reference to FIG. 19, to secure the first end 92 of the strength member end portion 80, a cable jacket tube 98 is provided as illustrated in FIGS. 19 and 20. The cable jacket 98 is used to secure the strength member pulling loop 90 to the cable jacket 70 of the fiber optic cable 74. FIG. 19 illustrates the cable jacket tube 98 before being heat shrunk onto the first end 92 of the strength member end portion 80 and the cable jacket 70 of the fiber optic cable 74. FIG. 20 illustrates the cable jacket tube 98 after being heat shrunk onto the first end 92 and the cable jacket 70 of the fiber optic cable 74. With reference to FIG. 19, the cable jacket tube 98 is disposed over the first end 92 of the strength member end portion 80 and the end portion 72 of the fiber optic cable 74 before the strength member pulling loop 90 is secured. For example, the cable jacket tube 98 may be a heat shrink tube. In this regard, the cable jacket tube 98 is heated to heat shrink the cable jacket tube 98 onto the first end 92 of the strength member end portion 80 and the cable jacket 70 to secure the formed strength member pulling loop 90, as illustrated in FIG. 20. As one non-limiting example, the strength member pulling loop 90 may be heated to a temperature between 100 and 200 degrees Celsius for between two (2) and four (4) minutes to heat shrink and secure the cable jacket tube 98 to the strength member end portion 80 and the cable jacket 70. A pressing force may be applied to the cable jacket tube 98 to promote adhesion between the cable jacket tube 98 and the first end 92 of the strength member end portion 80 to secure the strength member pulling loop 90 to the cable jacket 70.

Figure 21A:
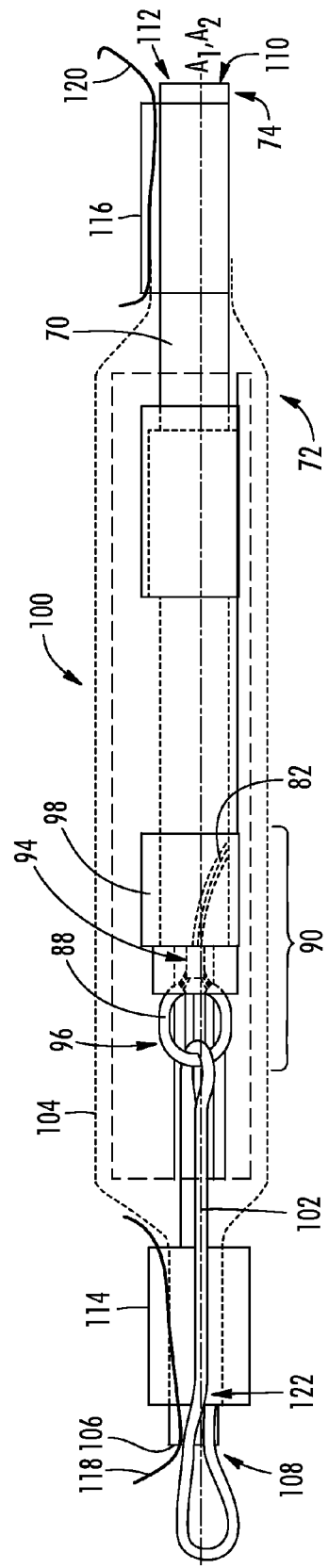
FIG. 21A is a schematic diagram of an exemplary assembled pulling grip assembly including a strength member pulling loop assembly.
Figure 21B:
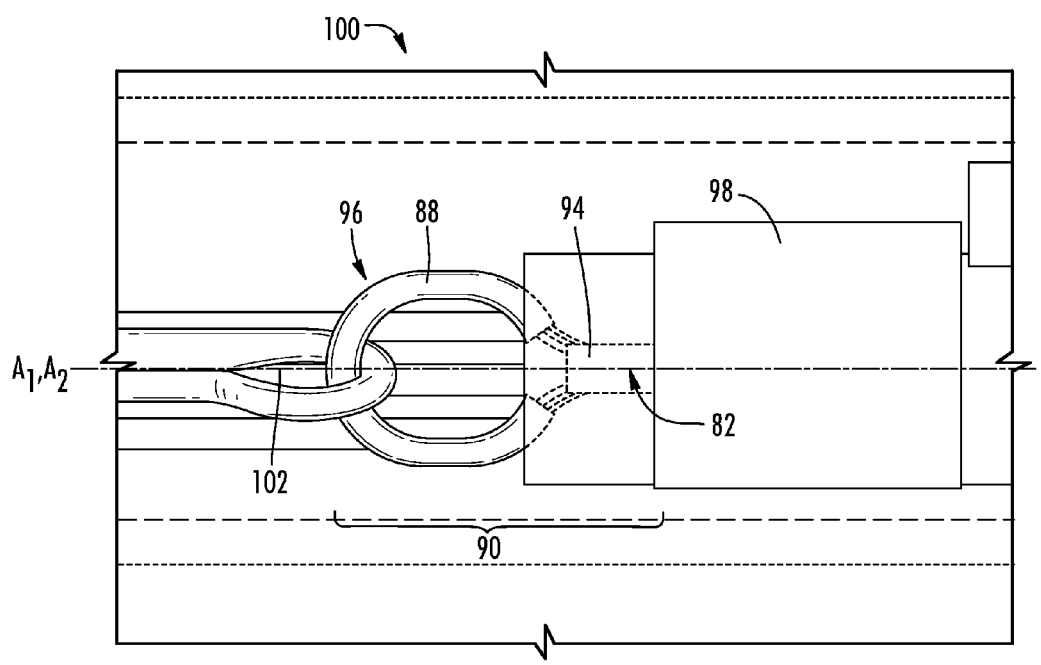
FIG. 21B is a close-up view of the strength member pulling loop in the strength member pulling loop assembly in FIG. 21A.

FIG. 21A is a schematic diagram of an assembled pulling grip assembly 100 that includes the strength member pulling loop 90 disposed in the fiber optic cable 74 in FIGS. 14-20. FIG. 21B is a close-up view of the strength member pulling loop 90 in the pulling grip assembly 100 in FIG. 21A. A pulling cord 102 is secured to the strength member loop portion 96 prepared from the strength member end portion 80 to apply the pulling load to the strength member loop portion 96 to pull the fiber optic cable 74. A pulling bag 104 is disposed around the strength member pulling loop 90 and the end portion 72 of the fiber optic cable 74 to form the pulling grip assembly 100 and protect the end portion 72 of the fiber optic cable 74 and any exposed optical fibers 79 during pulling. The pulling cord 102 is disposed through a first opening 106 on a first end 108 of the pulling bag 104.

With continuing reference to FIGS. 21A and 21B, the end portion 72 of the fiber optic cable 74 is disposed through a second opening 110 on a second end 112 of the pulling bag 104. To secure the pulling bag 104 around the end portion 72 of the fiber optic cable 74 during pulling, a first heat shrink tube 114 is disposed around the first end 108 of the pulling bag 104 and a second heat shrink tube 116 is disposed around the second end 112 of the pulling bag 104. The first and second heat shrink tubes 114, 116 are heat shrunk to secure the pulling bag 104 to the cable jacket 70 of the fiber optic cable 74. After pulling, the first and second heat shrink tubes 114, 116 can be removed to provide access to the exposed optical fibers 79 or optical fiber sub-units 78. For example, one or more rip cords 118, 120 may be inserted through the first opening 106 and the second opening 110 inside the first and second heat shrink tubes 114, 116, respectively as illustrated in FIG. 21A. The rip cords 118, 120 can be pulled to rip through the first and second heat shrink tubes 114, 116. Because the pulling cord 102 in this embodiment is provided in the pulling grip assembly 100 with an open loop 122, the pulling cord 102 can be pulled from the loop portion 96 and removed once the fiber optic cable 74 is pulled into position.

Figure 22:
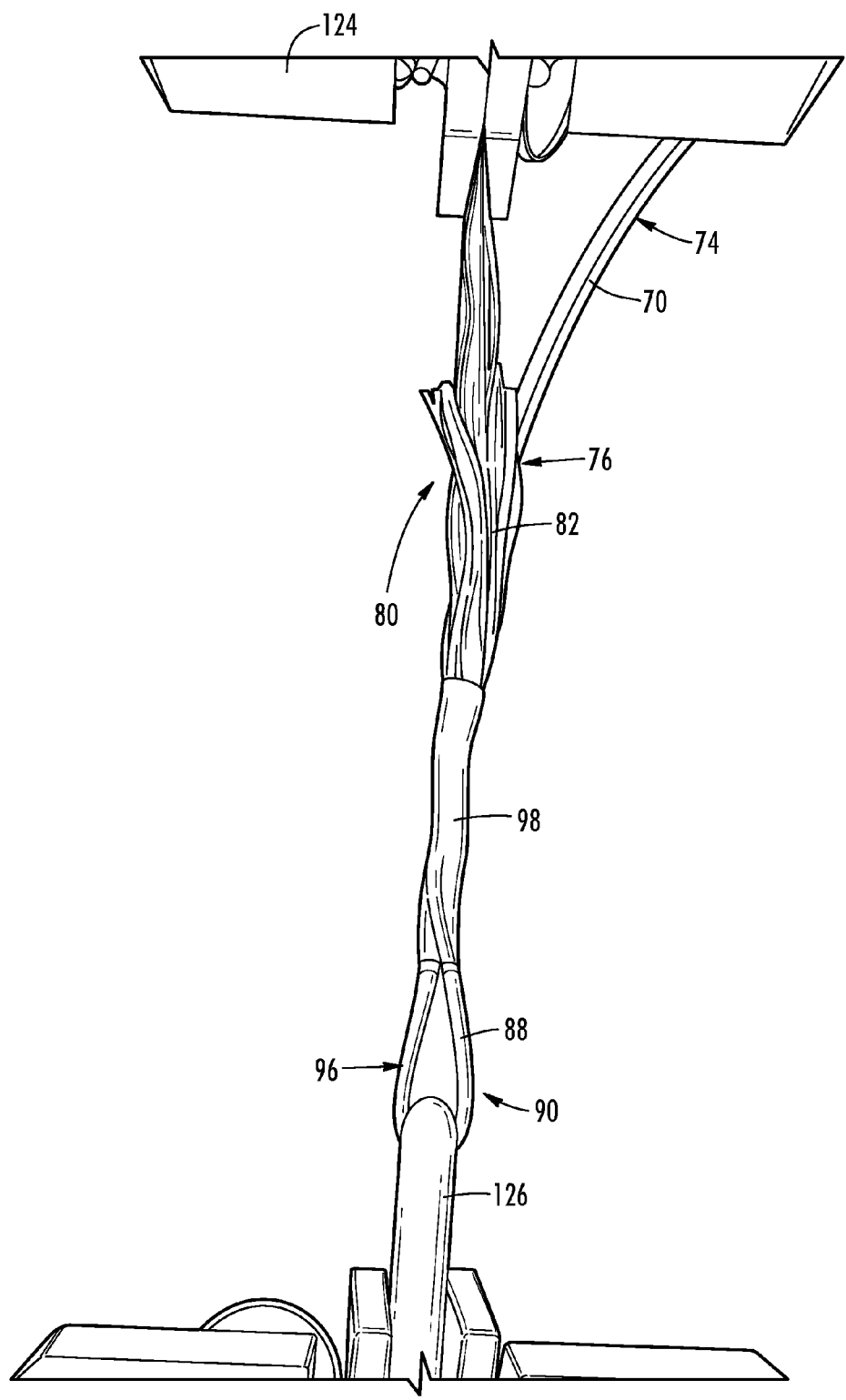
FIG. 22 illustrates placing a pulling load on the strength member pulling loop in the pulling grip assembly in FIG. 21A for pull strength testing.
Figure 23:
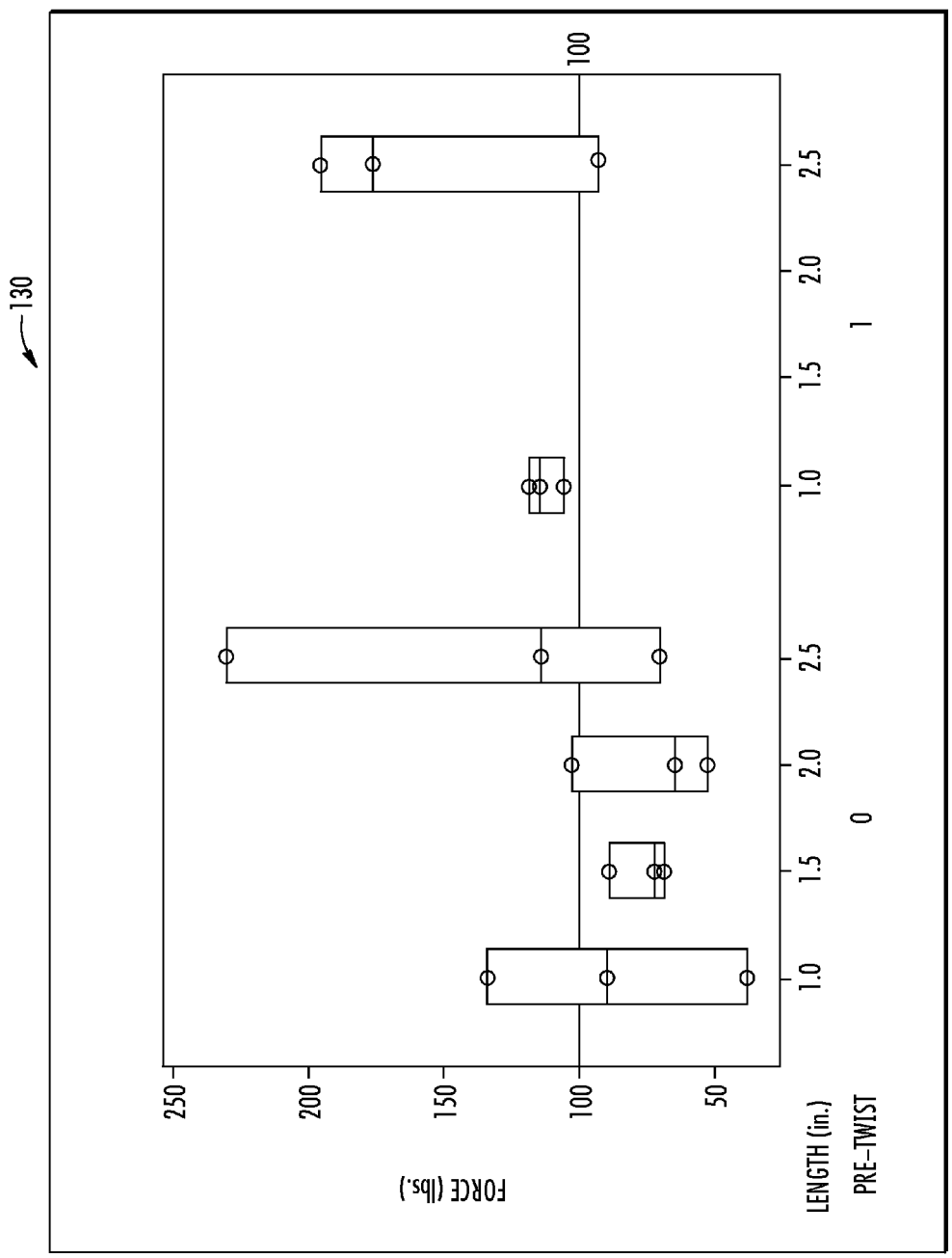
FIG. 23 illustrates an exemplary boxplot of pulling force tolerance for various lengths and with and without twisting of the strength member used to form the strength member pulling loop in FIG. 21A, heat shrunk with a heat gun setting at 500 degrees Fahrenheit.

FIG. 22 illustrates placing a pulling load on the strength member pulling loop 90 in FIGS. 13-21B to test pull strength. As illustrated therein, the strength member end portion 80 is secured to a platform 124 and a pulling loop 126 is attached to the loop portion 96 of the strength member pulling loop 90. FIG. 23 illustrates an exemplary boxplot 130 of pulling force tolerance for various lengths and with and without twisting of the strength member end portion 80 in the strength member pulling loop 90 in FIG. 21A, heat shrunk with a heat gun setting at 500 degrees Fahrenheit. The strength member tubes 86, 88 were heated until visually shrunk. Samples were made in various lengths from 1 inch to 2.5 inches and were further divided into pre-twisted (strand twisting) (labeled as "1" in the X-axis) and non-pre-twisted (labeled as "0" in the X-axis) categories. Pre-twisting means twisting before forming the strength member loop. As can be seen from the boxplot 130 in FIG. 23, there was a positive effect on the neck portion 94 length and pre-twisting on load carrying. However, there is a wide range of pulling force tolerances for the pre-twisted 2.5 inch sample.

Figure 24:
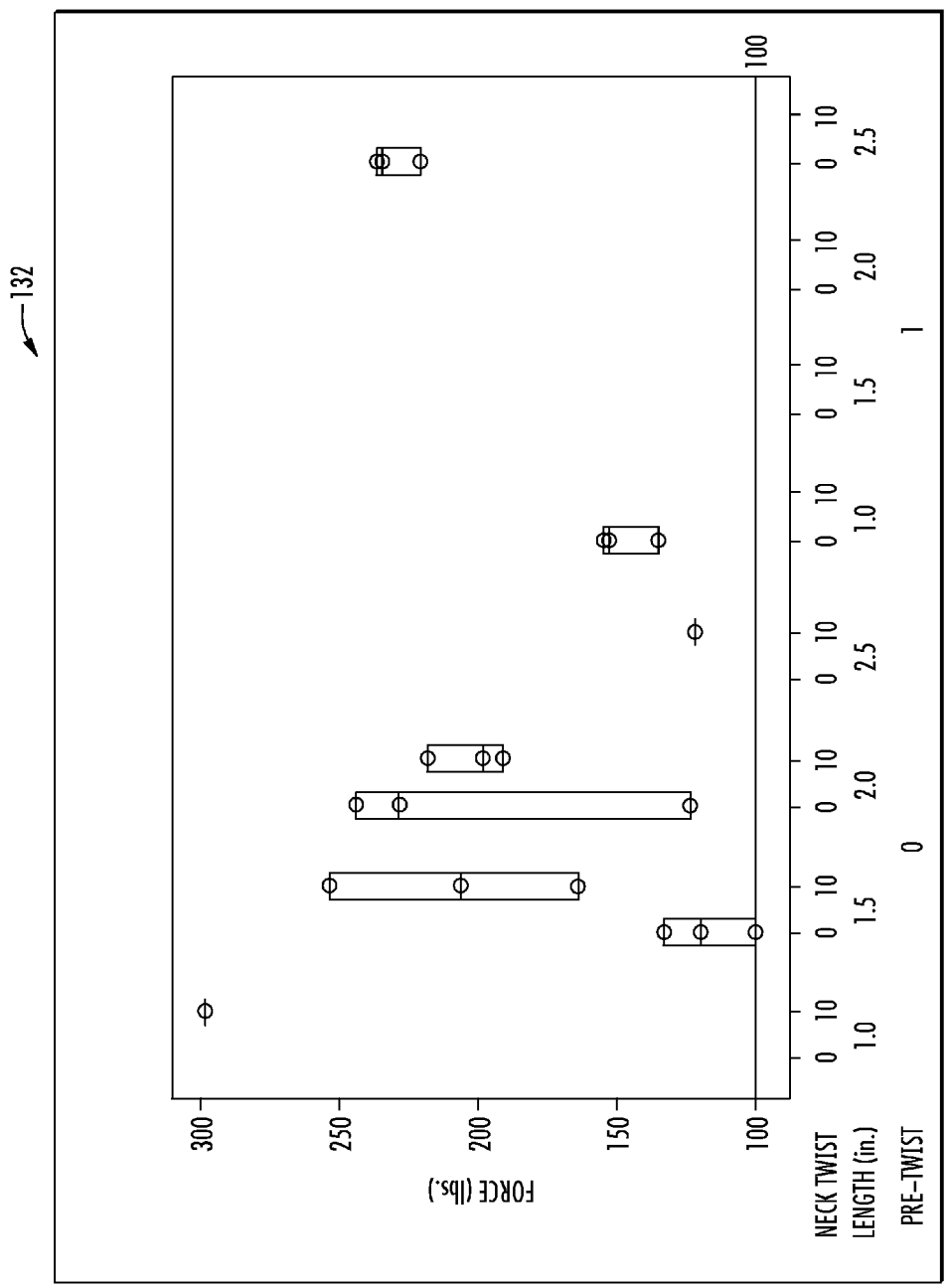
FIG. 24 illustrates an exemplary boxplot of pulling force tolerance for various lengths and with and without twisting of the strength member used to form the strength member pulling loop in FIG. 21A, heat shrunk with a heat gun setting at approximately 700 degrees Fahrenheit.

FIG. 24 illustrates an exemplary boxplot 132 of pulling force tolerance for various lengths and with and without twisting of the strength member 82 used to form the strength member pulling loop 90 in FIG. 21A, heat shrunk with a heat gun setting at approximately 700 degrees Fahrenheit. Some samples were made without pre-twisting (labeled as "0" in the X-axis), but including up to ten (10) neck twists (i.e., in units of number of turns) of the strength member end portion 80 (bundle twists) (labeled as "1" in the X-axis) which held sufficient load, although a broad range in pulling load was recognized. Pre-twisting means twisting before forming the strength member loop. The pre-twisted strength member 82 samples yielded consistent results and both the 1 inch and 2.5 inch lengths tried that were above a 100 pound requirement.

Figure 25:
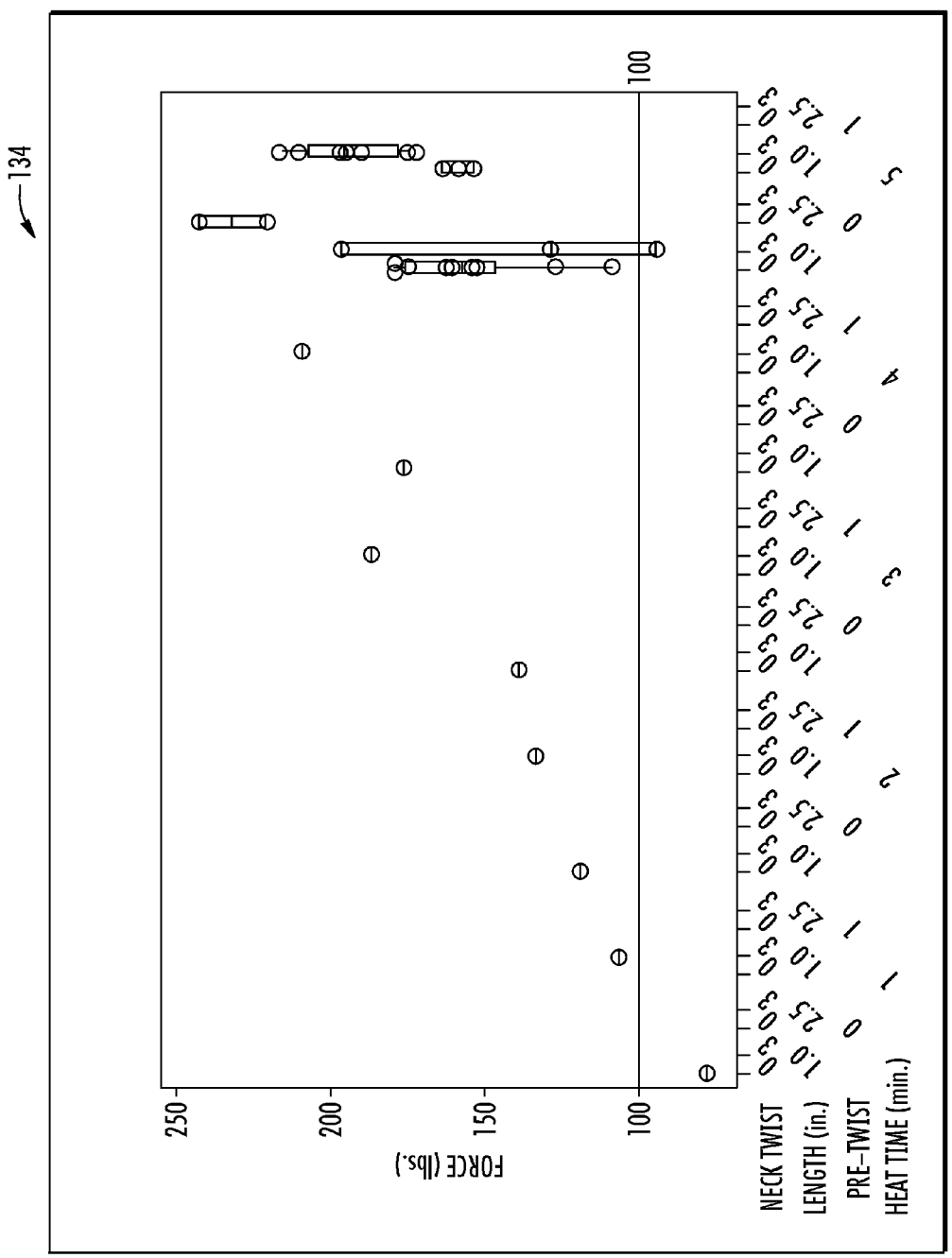
FIG. 25 illustrates an exemplary boxplot of pulling force tolerance for various lengths and with and without twisting of the strength member used to form the strength member pulling loop in FIG. 21A, heat shrunk in an oven at approximately 200 degrees Celsius.

FIG. 25 illustrates an exemplary boxplot 134 of pulling force tolerance for various lengths and with and without twisting of the strength member end portion 80 used to form the strength member pulling loop 90 in FIG. 21A, heat shrunk in an oven at approximately 200 degrees Celsius. Single samples with and without strength member 82 pre-twisting (labeled as "0" in the X-axis) were made in one (1) inch lengths and were loaded in the oven for times in increments of one (1) minute from one (1) to five (5) minutes. Pre-twisting means twisting before forming the strength member loop. These strength member end portion 80 samples were made with the intent of a comparison in twisting procedure. The cases that provided the least pulling load tolerance involved no twisting of the strength member end portion 80 samples, while the cases that involved pre-twisting (strand twisting) (labeled as "1" in the X-axis) and three (3) neck twists (bundle twists) (i.e., in units of number of turns) of the strength member end portion 80 provided the most pulling load tolerance. Several samples were tested at five (5) minute heating. The one (1) inch long pre-twisted strength member end portion 80 samples show less pulling load range than the non-twisted samples. Pre-twisting means twisting before forming the strength member loop. The 2.5 inch long neck portions 94 held more pulling load than the one (1) inch long neck portions 94.

Figure 26:
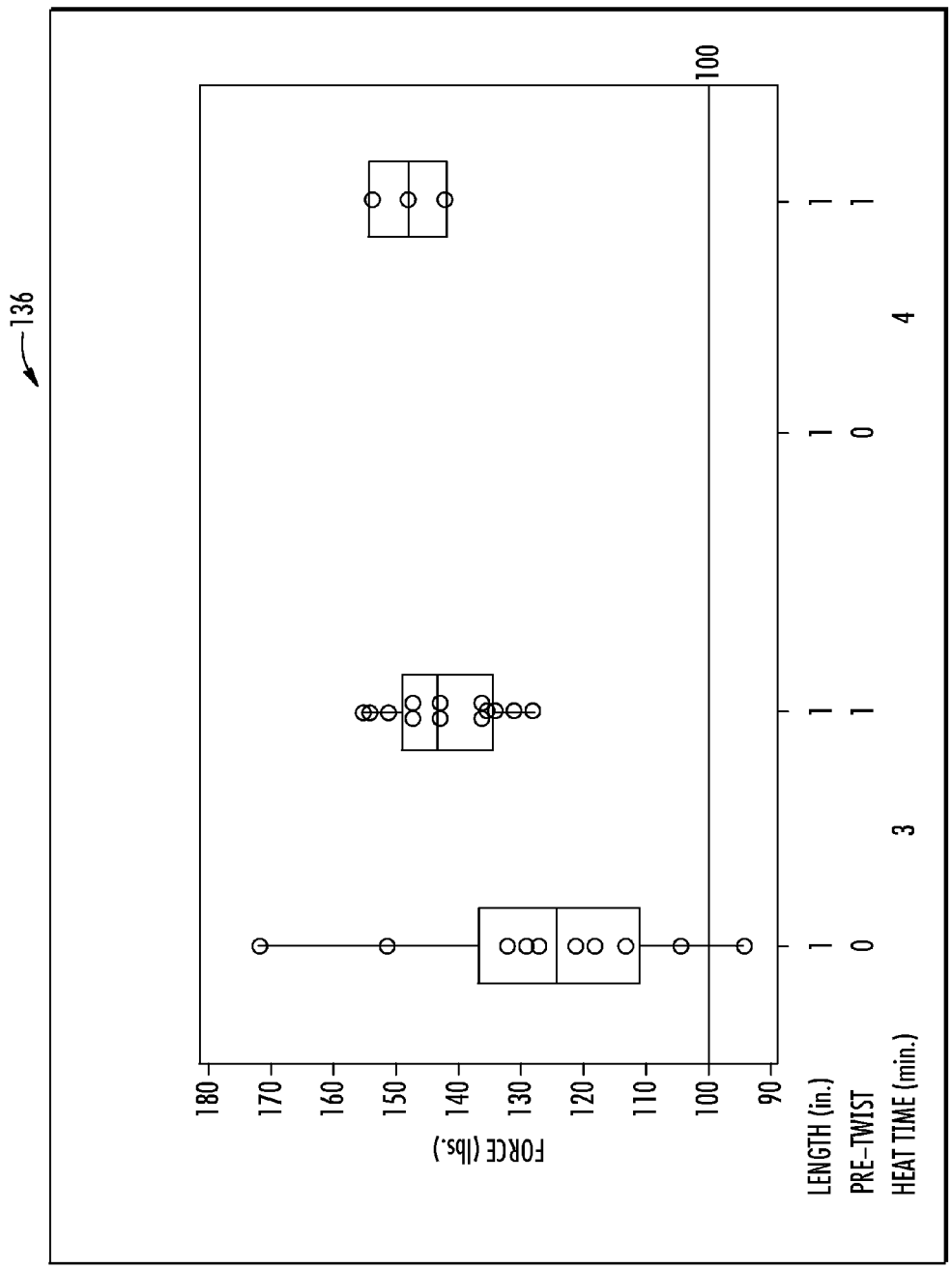
FIG. 26 illustrates an exemplary boxplot of pulling force tolerance for various lengths and with and without twisting of the strength member used to form the strength member pulling loop in FIG. 21A, heat shrunk in an oven at approximately 150 degrees Celsius.

FIG. 26 illustrates an exemplary boxplot 136 of pulling force tolerance for various lengths and with twisting (labeled as "1" in the X-axis) and without twisting (labeled as "0" in the X-axis) of the strength member end portion 80 used to form the strength member pulling loop 90 in FIG. 21A, heat shrunk in an oven at approximately 150 degrees Celsius. Several samples of the strength member 82, some pre-twisted, some not twisted, were made and heated for three (3) minutes. Pre-twisting was selected for further study in installation of heat shrink to make the neck portion 94 and loop portion 96 aid in pulling load carrying capability. Pre-twisting means twisting before forming the strength member loop. Additional neck portion 94 (bundle) twisting of the strength member end portion 80 was not tried in these comparisons to determine if this additional step was truly needed.

Figure 27:
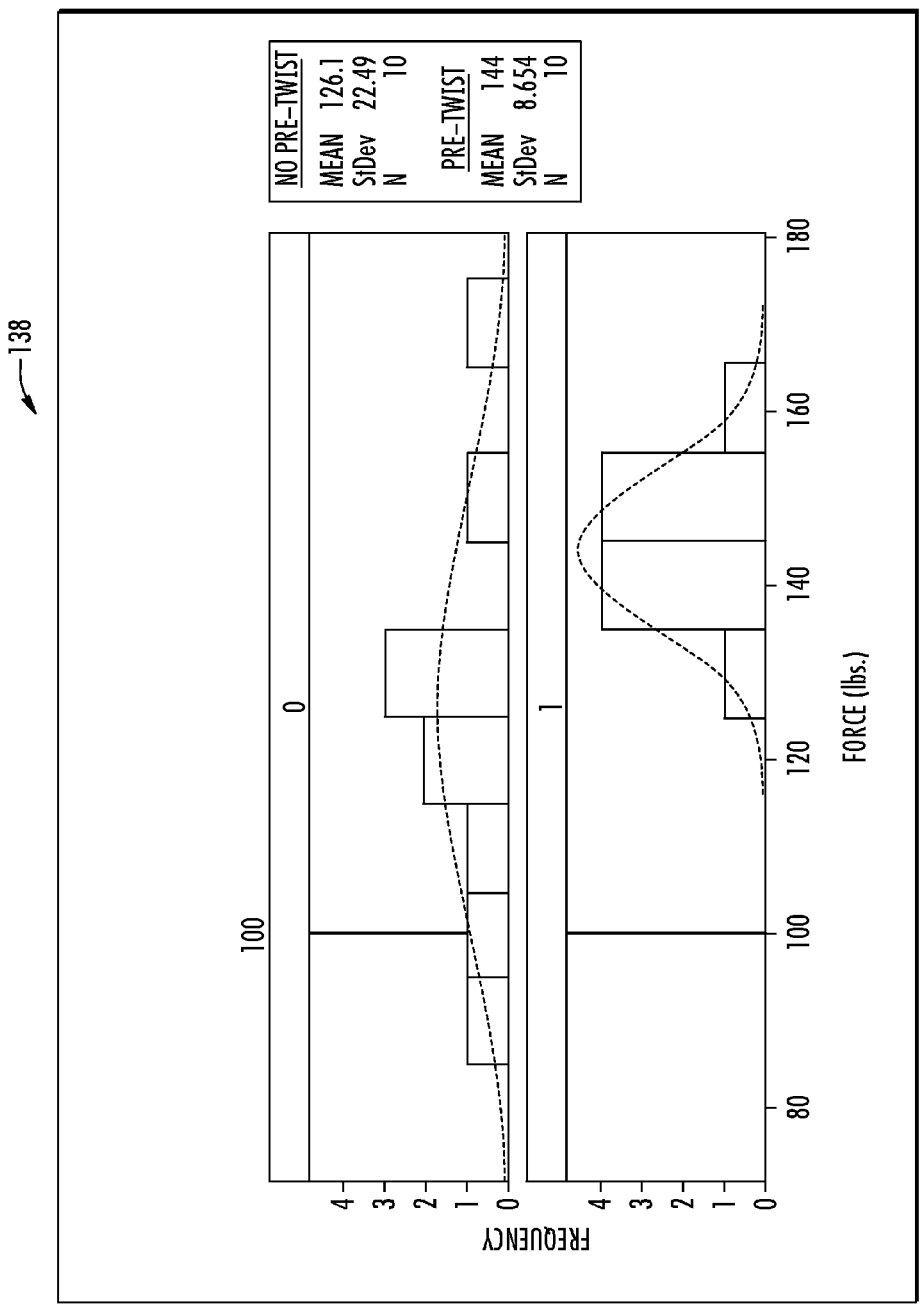
FIG. 27 is an exemplary histogram of force with and without twisting of the strength member used to form the strength member pulling loop in FIG. 21A, heat shrunk in an oven at approximately 150 degrees Celsius.
Figure 28:
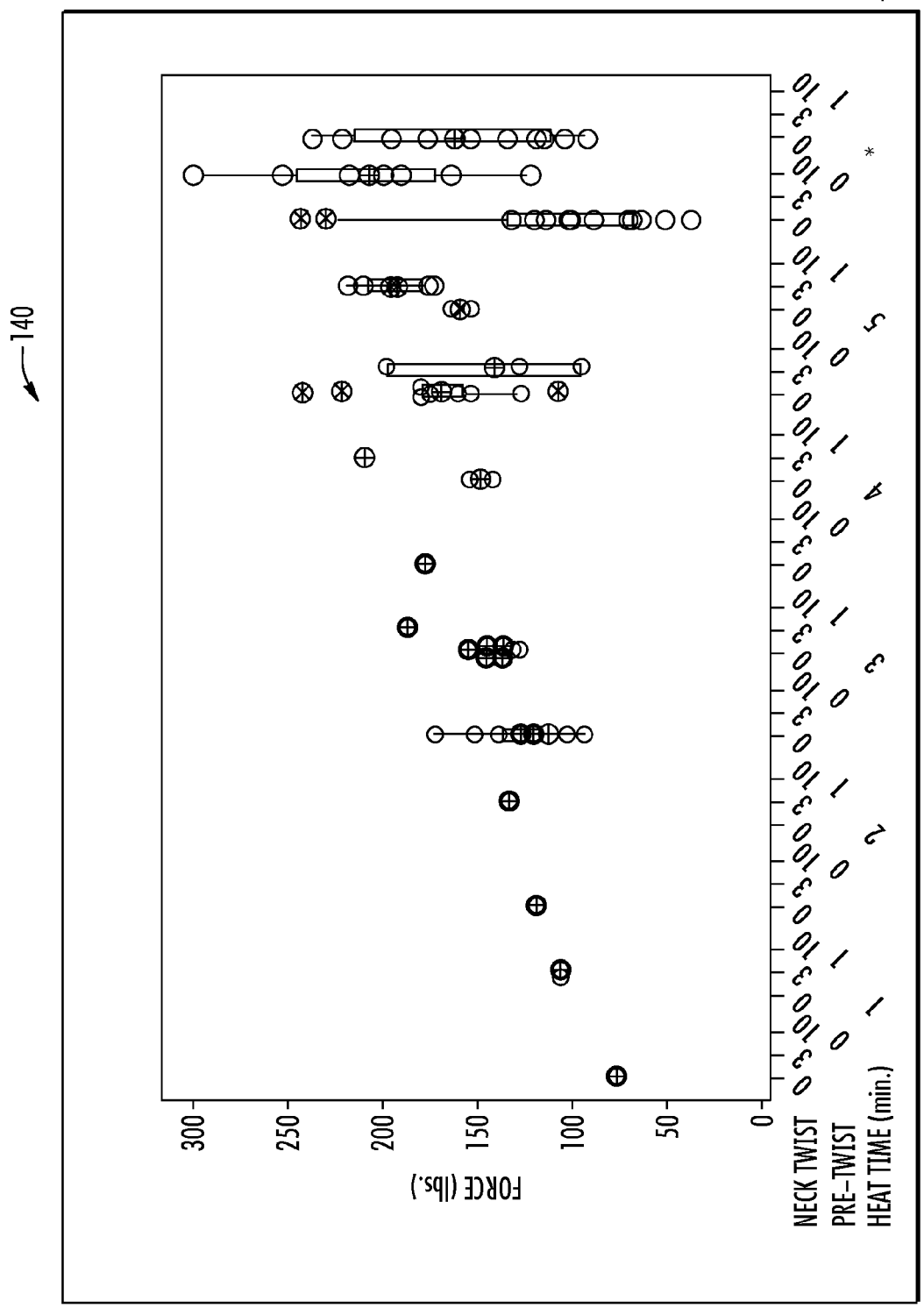
FIG. 28 illustrates an exemplary boxplot of pulling force tolerance for various twisting and heat times of the strength member used to form the strength member pulling loop in FIG. 21A.

FIG. 27 is an exemplary histogram 138 of force with and without twisting of the strength member end portion 80 used to form the strength member pulling loop 90 in FIG. 21A, heat shrunk in an oven at approximately 150 degrees Celsius. The pre-twisted strength member end portion 80 samples had a narrow range of sufficient pulling load handling capability, indicating a consistent process. Pre-twisting means twisting before forming the strength member loop. Pre-twisted samples of the strength member end portion 80 were made and heated for four (4) minutes and showed similar results to the three (3) minute heated samples. FIG. 28 illustrates an exemplary boxplot 140 of pulling force tolerance for various twisting and heat times of the strength member end portion 80 used to form the strength member pulling loop 90 in FIG. 21A. Heat time signifies the amount of time in minutes in which the strength member pulling loop 90 was heated inside an oven. The "*" notation signifies heating the strength member pulling loop 90 with a heat gun until observed as being heat shrunk.

As used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Many modifications and other embodiments of the embodiments set forth herein will come to mind to one skilled in the art to which the embodiments pertain having the benefit of the teachings presented in the foregoing descriptions and the associated drawings. For example, the embodiments herein can be applied to any type of cable and fiber optic cable that includes a strength member or members. The cable may include any other medium, including buffered and unbuffered optical fibers as an example. Tubing is not required to prepare a strength member loop. A pulling bag or other assembly to be disposed over the strength member pulling loop assembly is not required. Any sizes of the features disclosed herein may be provided without limitation.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A method of preparing a strength member pulling loop assembly in a fiber optic cable furcation, comprising:
   removing a portion of a cable jacket from an end portion of a fiber optic cable to expose end portions of one or more optical fibers and an end portion of a strength member from the cable jacket;
   twisting the strength member end portion;
   forming a strength member loop after twisting the strength member end portion by disposing a first end of the strength member end portion back towards the cable jacket to place a loop portion in the strength member end portion; and
   securing the first end of the strength member end portion to form a strength member pulling loop.

2. The method of claim 1, further comprising securing the twisted strength member end portion before forming the strength member loop.

3. The method of claim 1, further comprising disposing the strength member end portion in at least one strength member tube before forming the strength member loop.

4. The method of claim 3, wherein the at least one strength member tube is comprised of at least one heat shrink strength member tube.

5. The method of claim 4, further comprising heating the at least one heat shrink strength member tube around the strength member end portion before forming the strength member loop.

6. The method of claim 1, further comprising, before forming the strength member loop:
   disposing the first end of the strength member end portion in a first strength member tube; and
   disposing the first end of the strength member end portion through a second strength member tube after disposing the strength member end portion through the first strength member tube.

7. The method of claim 6, wherein the first strength member tube is comprised of a first heat shrink strength member tube, and the second strength member tube is comprised of a second heat shrink strength member tube.

8. The method of claim 7, further comprising heating the first heat shrink strength member tube and the second heat shrink strength member tube around the strength member end portion.

9. The method of claim 6, wherein forming the strength member loop comprises disposing the first end of the strength member end portion back through a first strength member tube portion in the first strength member tube to form a neck portion from the first strength member tube and dispose the loop portion in the second strength member tube, and disposing the first end of the strength member end portion back towards the cable jacket.

10. The method of claim 1, wherein the securing comprises securing the first end of the strength member end portion onto the cable jacket to form the strength member pulling loop.

11. The method of claim 10, further comprising disposing a cable jacket tube over the first end of the strength member end portion and an end portion of the cable jacket before securing the first end of the strength member end portion onto the cable jacket.

12. The method of claim 11, further comprising pressing the cable jacket tube to promote adhesion between the cable jacket tube and the first end of the strength member end portion.

13. The method of claim 11, wherein the securing comprises heat shrinking the cable jacket tube to secure the first end of the strength member end portion to the end portion of the cable jacket to form the strength member pulling loop.

14. The method of claim 13, further comprising pressing the cable jacket tube to promote adhesion between the cable jacket heat shrink tube and the first end of the strength member end portion.

15. A method of preparing a strength member pulling loop assembly in a fiber optic cable furcation, comprising:
   removing a portion of a cable jacket from an end portion of a fiber optic cable to expose end portions of one or more optical fibers and an end portion of a strength member from the cable jacket;
   forming a strength member loop by disposing a first end of the strength member end portion back towards the cable jacket to place a loop portion in the strength member end portion; and
   securing the first end of the strength member end portion in a furcation plug to form a strength member pulling loop.

16. The method of claim 15, further comprising disposing a potting compound inside the furcation plug to secure the first end of the strength member end portion in the furcation plug to form the strength member pulling loop.

17. The method of claim 16, further comprising curing the potting compound inside the furcation plug to secure the first end of the strength member end portion in the furcation plug to form the strength member pulling loop.

18. A fiber optic cable assembly, comprising:
a fiber optic cable comprising one or more optical fibers and a strength member disposed inside a cable jacket;
an end portion of the fiber optic cable comprising end portions of one or more end portions of the one or more optical fibers exposed from the cable jacket and an end portion of the strength member exposed from the cable jacket, wherein at least one twist is disposed in the strength member end portion; and
a strength member pulling loop, comprising:
a strength member loop formed from a first end of the strength member end portion disposed back towards the cable jacket to place a loop portion in the strength member end portion; and
a securing component securing the first end of the strength member end portion.

19. The fiber optic cable assembly of claim 18, wherein the strength member loop further comprises at least one strength member tube disposed in at least a portion of the strength member end portion.

20. The fiber optic cable assembly of claim 18, wherein the strength member loop further comprises a neck portion coupled to the loop portion.

21. The fiber optic cable assembly of claim 20, wherein the strength member loop further comprises a first strength member tube disposed around the strength member end portion and a second strength member tube disposed around the strength member end portion, wherein the first end of the strength member end portion is disposed back through the first strength member tube to form the neck portion and form the loop portion in the second strength member tube.

22. The fiber optic cable assembly of claim 21, wherein the first strength member tube is comprised of a first heat shrink strength member tube, and the second strength member tube is comprised of a second heat shrink strength member tube.

23. A fiber optic cable assembly, comprising:
a fiber optic cable comprising one or more optical fibers and a strength member disposed inside a cable jacket;
an end portion of the fiber optic cable comprising end portions of one or more end portions of the one or more optical fibers exposed from the cable jacket and an end portion of the strength member exposed from the cable jacket;
a cable jacket tube disposed over the first end of the strength member end portion and an end portion of the cable jacket; and
a strength member pulling loop, comprising:
a strength member loop formed from a first end of the strength member end portion disposed back towards the cable jacket to place a loop portion in the strength member end portion; and
a securing component securing the first end of the strength member end portion onto the cable jacket;
wherein the cable jacket tube is comprised of a cable jacket heat shrink tube.

24. A fiber optic cable assembly, comprising:
a fiber optic cable comprising one or more optical fibers and a strength member disposed inside a cable jacket;
an end portion of the fiber optic cable comprising end portions of one or more end portions of the one or more optical fibers exposed from the cable jacket and an end portion of the strength member exposed from the cable jacket; and
a strength member pulling loop, comprising:
a strength member loop formed from a first end of the strength member end portion disposed back towards the cable jacket to place a loop portion in the strength member end portion; and
a securing component securing the first end of the strength member end portion, wherein the securing component is comprised of a furcation plug.

25. The fiber optic cable assembly of claim 24, further comprising a potting compound disposed inside the furcation plug to secure the first end of the strength member end portion in the furcation plug to form the strength member pulling loop.

26. A fiber optic cable assembly, comprising:
a fiber optic cable comprising one or more optical fibers and a strength member disposed inside a cable jacket;
an end portion of the fiber optic cable comprising end portions of one or more end portions of the one or more optical fibers exposed from the cable jacket and an end portion of the strength member exposed from the cable jacket;
a strength member pulling loop, comprising:
a strength member loop formed from a first end of the strength member end portion disposed back towards the cable jacket to place a loop portion in the strength member end portion; and
a securing component securing the first end of the strength member end portion;
a pulling cord disposed through the strength member loop; and
a pulling bag disposed around the strength member loop and the end portion of the fiber optic cable to form a pulling grip assembly, wherein the pulling cord is disposed through a first opening on a first end of the pulling bag and the end portion of the fiber optic cable is disposed through a second opening on a second end of the pulling bag.

27. The fiber optic cable assembly of claim 26, further comprising a first heat shrink tube disposed over the first end of the pulling bag.

28. The fiber optic cable assembly of claim 27, wherein the first heat shrink tube secures the first end of the pulling bag to the end portion of the fiber optic cable.

29. The fiber optic cable assembly of claim 27, further comprising a first rip cord inserted through the first opening of the first end of the pulling bag.

30. The fiber optic cable assembly of claim 26, further comprising a second heat shrink tube disposed over the second end of the pulling bag.

31. The fiber optic cable assembly of claim 30, wherein the second heat shrink tube secures the pulling cord through the second opening of the pulling bag.

32. The fiber optic cable assembly of claim 30, further comprising a second rip cord inserted through the second opening of the second end of the pulling bag.

* * * * *